United States Patent [19]
LaPerre et al.

[11] Patent Number: 6,060,157
[45] Date of Patent: May 9, 2000

[54] TRANSPARENT DECORATIVE ARTICLE HAVING AN ETCHED APPEARING/PRISMATIC IMAGE THEREON

[75] Inventors: James Douglas LaPerre, River Falls, Wis.; Warren Douglas Burke, Maplewood, Minn.

[73] Assignee: 3M Innovative Properties Company, St. Paul, Minn.

[21] Appl. No.: 08/849,139

[22] PCT Filed: Nov. 27, 1995

[86] PCT No.: PCT/US95/15424

§ 371 Date: May 28, 1997

§ 102(e) Date: May 28, 1997

[87] PCT Pub. No.: WO96/17263

PCT Pub. Date: Jun. 6, 1996

Related U.S. Application Data

[63] Continuation-in-part of application No. 08/346,480, Nov. 29, 1994, abandoned.

[51] Int. Cl.⁷ ........................................................ B32B 5/16
[52] U.S. Cl. ........................ 428/325; 428/212; 428/213; 428/332; 428/913
[58] Field of Search ............................... 428/323, 325, 428/212, 213, 332, 913

[56] References Cited

U.S. PATENT DOCUMENTS

| | | | |
|---|---|---|---|
| 2,354,048 | 7/1944 | Palmquist | 359/540 |
| 3,312,006 | 4/1967 | Rowland | 428/172 |
| 3,493,403 | 2/1970 | Tung et al. | 106/47 |
| 4,049,337 | 9/1977 | Eingenmann et al. | 350/105 |
| 4,367,920 | 1/1983 | Tung et al. | 350/105 |
| 4,569,857 | 2/1986 | Tung et al. | 427/163 |
| 4,650,283 | 3/1987 | Orensteen et al. | 350/105 |
| 4,656,072 | 4/1987 | Coburn, Jr. et al. | 428/40 |
| 4,673,609 | 6/1987 | Hill | 428/187 |
| 4,691,993 | 9/1987 | Porter et al. | 359/537 |
| 4,791,010 | 12/1988 | Haley | 428/34 |
| 4,897,136 | 1/1990 | Bailey et al. | 156/145 |
| 4,921,754 | 5/1990 | Ishihara | 428/325 |
| 4,983,436 | 1/1991 | Bailey et al. | 428/40 |
| 5,154,959 | 10/1992 | Dei Rossi | 428/38 |
| 5,169,707 | 12/1992 | Raykish et al. | 428/195 |
| 5,346,954 | 9/1994 | Wu et al. | 525/85 |
| 5,378,520 | 1/1995 | Nagaoka | 428/72 |
| 5,417,515 | 5/1995 | Hachey et al. | 404/15 |
| 5,468,540 | 11/1995 | Lu | 428/156 |
| 5,620,775 | 4/1997 | LaPerre | 428/149 |
| 5,670,096 | 9/1997 | Lu | 264/1.1 |
| 5,736,602 | 4/1998 | Crocker et al. | 524/494 |
| 5,777,790 | 7/1998 | Nakajima | 359/536 |

FOREIGN PATENT DOCUMENTS

| | | |
|---|---|---|
| 0 602 599 A1 | 12/1993 | European Pat. Off. . |
| 5-113502 | 7/1993 | Japan . |
| 5-307347 | 11/1993 | Japan . |
| 2 254042 | 9/1992 | United Kingdom . |
| WO 92/19994 | 11/1992 | WIPO . |

*Primary Examiner*—Hoa T. Le
*Attorney, Agent, or Firm*—Janice L. Dowdall

[57] ABSTRACT

The present invention provides transparent decorative articles formed from a transparent substrate, glass microspheres, and a bonding layer, optional layers, and optional coatings, having an etched appearance or rainbow-like appearance depending on illumination conditions and viewing angle. Transfer graphics and transfer media are also provided. The ratio of the transparent microsphere refractive index to the transparent microsphere bonding layer refractive index is about 1.3:1 to about 1.7:1. From about 20% to about 80% of the average diameter of each microsphere is embedded in the bonding layer.

84 Claims, 10 Drawing Sheets

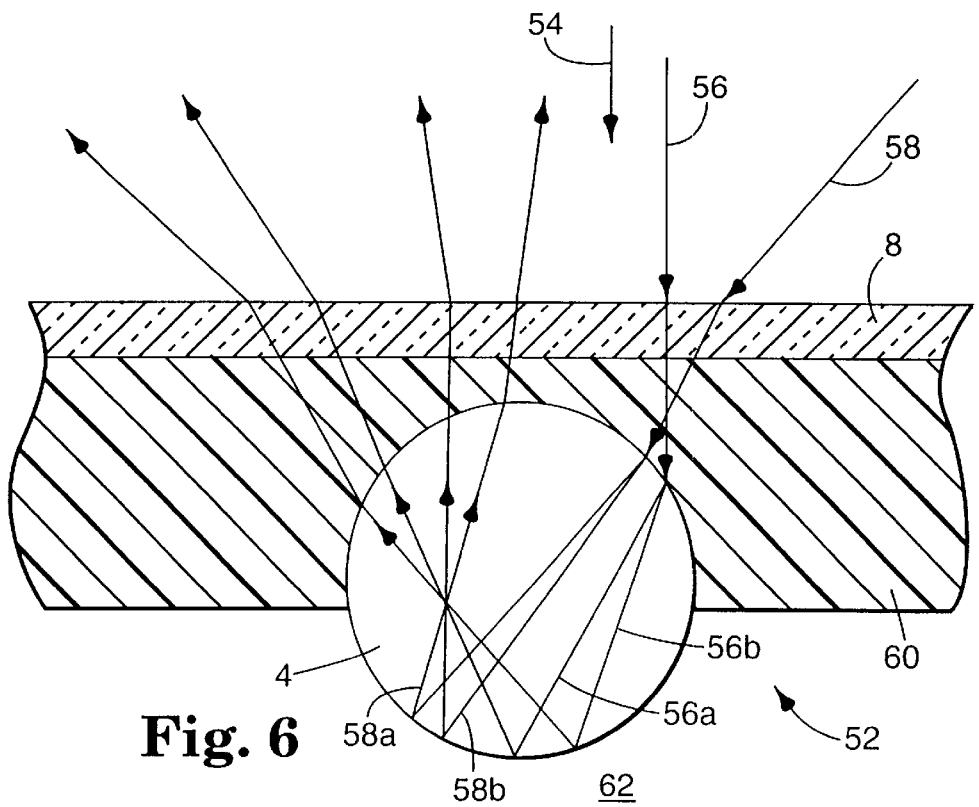
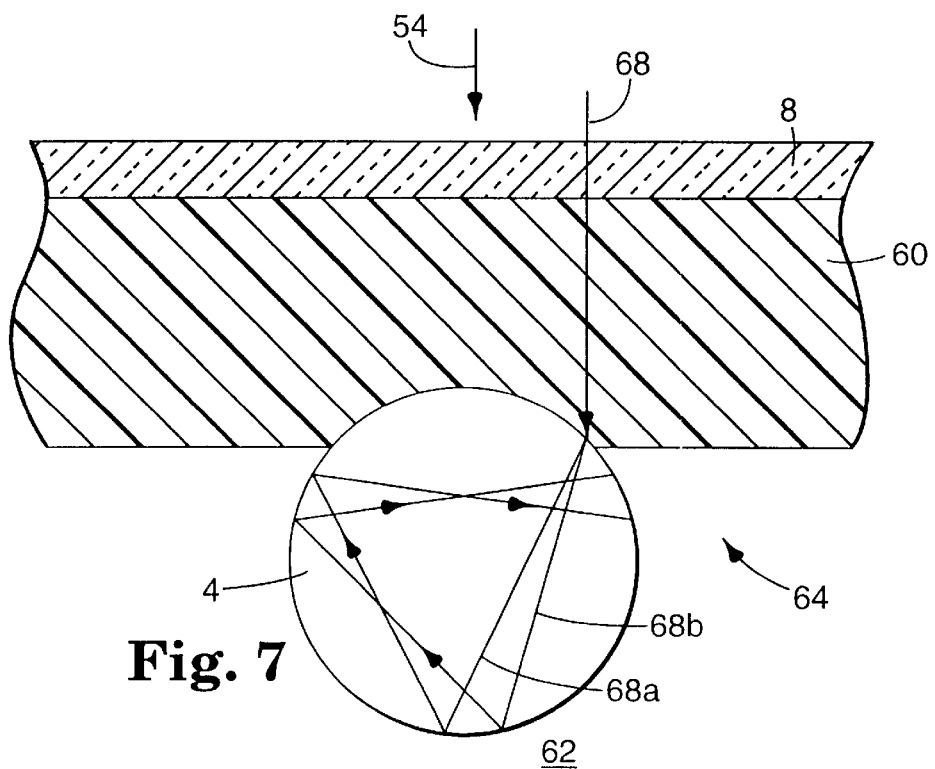

TRANSPARENT DECORATIVE ARTICLE HAVING AN ETCHED APPEARING/ PRISMATIC IMAGE THEREON

This application is a continuation-in-part of U.S. Ser. No. 08/346,480 (now abandoned), filed Nov. 29, 1994, from which priority is hereby claimed.

FIELD OF THE INVENTION

This invention relates to a transparent decorative article having an image which approximates the translucent appearance of an impingement or chemically etched surface, but which also exhibits a rainbow-like color progression at specific conditions of illumination and observation, much like a naturally occurring rainbow. The invention also relates to transfer graphics which can be used in forming the decorative articles and graphic media which can be used in forming the transfer graphics.

BACKGROUND OF THE INVENTION

A historical method of providing an etched translucent image on a window or transparent objet d'art is to protect all the surrounding surfaces with an intimately bonded, temporary masking material having the negative image of the intended image. The exposed image area is then eroded away via abrasive projectile impingement or chemical erosion, to generate an irregular surface. Finally, the masking material is removed. The translucence created by diffusion of the light impinging on the irregular surface contrasts with light which is transmitted by or specularly reflected from the adjacent transparent area resulting in a decorative image.

The common viewing condition for etched transparent articles such as a window glass is via its second surface, (i.e., when the observer is standing outside, looking through the first surface of the window at the image etched on the inside or second surface). One practical reason for having the image on the inside is that if the etched surface would become wet with rain water the image would become distorted because the diffusing surface would be covered by water. For this outside viewing condition the image that is etched on the inside of the window is the reverse or mirror image of the desired viewing image. Another, more aesthetic reason for commonly viewing the etched image through the glass is the uniform and high surface gloss of the first surface. It is desirable that a decorating method meant to approximate the aesthetic characteristics of etched glass is compatible with the common viewing condition. Etching of window glass, high refractive index glass, or transparent polymeric plastic via the above methods results in an image that has the same milky-white, translucent color in all viewing conditions, regardless of illumination and observation angle, (i.e., no display of prismatic color is evident).

The above-described historical etching method is disadvantageous in that it is time consuming, labor intensive, and results in an etched appearance which is not reversible. For this reason other methods have been developed which imitate the appearance of etching, but which are more economical and potentially reversible. One such method is to bond a clear adhesive plastic film having a screen printed ink image thereon which simulates the appearance of an etched surface by having the ink contain opacifying pigments and/or flattening pigments, such as is taught in British Patent No. 2,254,042. Another method found commercially involves the use of a pressure-sensitive adhesive coated plastic film containing fillers and flattening agents which approximate an etched appearance. This film is provided on a release liner and can be cut via computer driven X-Y cutters, separated from its background image, and applied as a transfer graphic to a glass or plastic surface to provide an etched appearance. Removal could be accomplished via solvent soak or scraping with a sharp edge. As with historical etching methods, neither method provides a prismatic color display under any condition of illumination or observation.

For creating decorative prismatic color displays there are a variety of methods. The historical method involves the use of a prism, which is a high refractive index glass having a surface consisting of angularly cut facets. Typically, the prism is placed where it can be illuminated by sunlight, such as by hanging in front of a window where sunlight is present. The light passing through the prism is dispersed into its visible wavelengths and projected onto a viewing surface such as an interior wall. Because of the multiple facets, multiple images are projected. These images have rainbow-like color progressions. Rainbow-like images are also visible within the prism itself, reflected off the interior faceted surfaces. Faceted prisms can be affixed on one or more surfaces to enhance their decorative appeal, but as relatively large, discrete objects, prisms are not practical for decorating continuous surfaces. Rather, they are typically employed as spot decorations.

Diffraction gratings are another method of creating a decorative prismatic display. White light falling on a reflecting surface having surface imperfections which are about the size of a wavelength of light of the visible spectrum will be spread around and past the obstacles, providing a colorful display which can be used for decorative effects. Typically, the diffraction grating is embossed into the second surface of a transparent polymeric film and then covered with a thin layer of a reflecting mirror such as via silver reduction or vapor deposited aluminum. Holographic imaging techniques can provide more complex decorative images having a three-dimensional appearance. Most commercial decorative holographic displays are opaque because of the reflecting surface; however, JP 53-07347 describes such a device that uses a transparent reflecting surface instead of metal.

The primary disadvantages of such diffraction based decorative devices is that the requirement for an internal or second reflecting surface makes it very difficult to simultaneously create a translucent decorative etched appearance which approximates the traditional methods.

SUMMARY OF THE INVENTION

In contrast to the foregoing, the present invention provides a decorative article which has the appearance of an etched surface and also provides a decorative rainbow-like spectral display when viewed through the first surface off axis from an illuminating source. Further, with this invention it is possible to create large area spectral displays which exhibit a uniform and gradual rainbow-like color change, or more than one rainbow-like color change at different viewing angles relative to an illuminating source. Furthermore, by adjusting the design parameters of this invention it is possible to provide hidden images within the boundaries of the original design that appear and disappear depending on the viewing angle, or create the illusion of a three dimensional appearance.

The present invention provides a first decorative article comprising:

(a) a transparent substrate; and (b) a layer of transparent solid glass microspheres bonded to one side of the transparent substrate in the form of an image by a transparent bonding layer, wherein the microspheres are partially embedded in the transparent bonding layer, wherein about 20% to about 80% of the average diameter of each microsphere is embedded in the transparent bonding layer, and wherein the ratio of the transparent microsphere refractive index to the transparent bonding layer refractive index is about 1.3:1 to about 1.7:1;

(c) an optional transparent adhesive layer affixed between the transparent substrate and the transparent microsphere bonding layer; and (d) an optional transparent reinforcing layer affixed between the transparent microsphere bonding layer and the optional transparent adhesive layer when present.

The decorative article typically comprises a transparent substrate, such as a glass window, plastic sheet or film, or glass or plastic objet d'art to which is affixed on the second surface (i.e., the surface farthest away from a viewer), in the form of an image, such as lettering, scrolls, or decoration, typically consisting of a monolayer of transparent glass microspheres having a typical average diameter of between about 5–200 microns, the microsphere image being embedded in a transparent microsphere bonding layer affixed to the transparent substrate such that about 20% to about 80% of the average diameter is exposed to ambient atmosphere.

The present invention also provides transfer graphics which can be used to form the decorative articles of the invention. A transfer graphic may be applied to the second surface of a transparent substrate to provide an image thereon and thus form the decorative articles of the invention. The transfer graphic of the invention comprises a continuous support layer, having a continuous first adhesive layer thereon; hereafter referred to as a "transfer carrier". The transfer carrier adhesive may be temporarily bonded to what may be defined as a graphic image. The graphic image may be defined as an area to be delineated inside the boundaries of the surface of the transparent substrate, wherein a visible design contrast is created against the background of the transparent substrate.

The graphic image comprises a layer, typically a monolayer of the aforesaid transparent microspheres embedded at about 20% to about 80% of the average diameter of each microsphere in a transparent microsphere bonding layer, which forms the aforesaid transparent refractive index ratio range with the transparent microspheres. The transparent microsphere bonding layer has a second surface which is either directly suitable for bonding the graphic to a transparent substrate, in which case it also functions as the substrate adhesive, or is, in turn, bonded to an optional transparent adhesive layer which transparent adhesive layer is suitable for bonding said microsphere bonding layer to a transparent substrate.

Optionally, a transparent reinforcing layer may be affixed between the transparent microsphere bonding layer and the optional transparent adhesive layer (i.e., bonded to the microsphere bonding layer and the transparent substrate), to aid in the cutting and weeding process known by those skilled in the transfer graphics art, by which a graphic image is formed. The transparent substrate adhesive may be permanently tacky, i.e., a pressure-sensitive adhesive. It is protected by a release liner. The adhesion of the transfer carrier to the transparent microsphere layer must be greater than the adhesion of the transparent adhesive, or the transparent microsphere bonding layer when it also functions as the adhesive layer to the aforesaid release liner, such that the release liner can be removed and the transfer graphic elements will remain with the transfer carrier. Additionally, the graphic elements on the transfer carrier must adhere more strongly to the transparent substrate than they do to the transfer carrier, to allow removal of the transfer carrier after application to the transparent substrate.

Within the scope of this invention is anticipated the possibility wherein the continuous support layer of the aforesaid transfer carrier is a thermoplastic film that can function as both the support layer and the first adhesive layer temporarily bonding the transfer graphic to the microsphere image by virtue of being brought into contact with the microspheres while in a heated condition.

The transfer graphic of the present invention comprises:
(a) a release liner;
(b) a transparent microsphere bonding layer formed on one side of the release liner;
(c) a layer of transparent solid glass microspheres partially embedded in the transparent microsphere bonding layer, wherein about 20% to about 80% of the average diameter of each microsphere is embedded in the transparent microsphere bonding layer, wherein the ratio of the transparent microsphere refractive index to the transparent microsphere bonding layer refractive index is about 1.3:1 to about 1.7:1;
(d) an optional transparent adhesive layer affixed between the release liner and the transparent microsphere bonding layer;
(e) an optional transparent reinforcing layer affixed between the optional transparent adhesive layer, when present, and the transparent microsphere bonding layer; and
(f) a transfer carrier adhered to the glass microspheres.

A further embodiment of this invention is to provide a graphic media which is defined as a continuous sheet out of which a graphic image may be delineated either by cutting and/or printing thereon. The graphic media is typically provided in continuous sheet or roll form separate from said transfer carrier, so that a wider range of decorative images can be cut on demand via dies or a computer driven X-Y cutter, and/or printed thereon followed by removal from the release liner of the background cut image from the foreground cut image; followed further, by lamination to the separately supplied transfer carrier to form the aforesaid transfer graphic; followed still further by application of the transfer graphic to a transparent substrate to form said decorative article.

The present invention also provides a graphic media comprising:
(a) a release liner;
(b) a continuous transparent bonding layer formed on one side of the release liner;
(c) a layer of transparent solid glass nicrospheres partially embedded in the transparent microsphere bonding layer, wherein about 20% to about 80% of the average diameter of each microsphere is embedded in the transparent microsphere bonding layer, wherein the ratio of the transparent microsphere refractive index to the transparent microsphere bonding layer refractive index is about 1.3:1 to about 1.7:1;
(d) an optional transparent adhesive affixed between said transparent microsphere bonding layer and said transparent substrate; and
(e) an optional transparent reinforcing layer affixed between said transparent microsphere bonding layer and said transparent adhesive, when present.

The present invention also provides an imaged graphic media comprising:

(a) a release liner;

(b) a discontinuous transparent microsphere bonding layer formed on one side of the release liner;

(c) a layer of transparent solid glass microspheres partially embedded in the transparent microsphere bonding layer, wherein about 20% to about 80% of the average diameter of each microsphere is embedded in the transparent bonding layer, wherein the ratio of the transparent microsphere refractive index to the transparent microsphere bonding layer refractive index is about 1.3:1 to about 1.7:1;

(d) an optional transparent adhesive affixed between said transparent microsphere bonding layer and said transparent adhesive layer, and (e) an optional transparent reinforcing layer affixed between said transparent microsphere bonding layer and said transparent adhesive layer, when present.

A further embodiment of this invention involves variations within the aforesaid design parameters to create more visually complex images. Examples of such variation include but are not limited to providing more than one microsphere size distribution, and/or more than one microsphere refractive index, and/or more than one transparent microsphere bonding layer refractive index, within a given image area to create additional visual contrast between adjacent elements of the image. The visual contrast can be due to adjacent variations in color as a function of viewing angle relative to the light source or due to relative degree of light diffusion.

A further embodiment of the invention is provided when one or more images of one or more coatings such as an ink is provided on the second surface side of the monolayer of transparent microspheres (the side not embedded in the transparent microsphere bonding layer) to further alter the optical path. If the coating is opaque or translucent it will simply create a contrasting image at all viewing angles to the refracted colored image in the unpainted area. It was discovered that if the coating is transparent and thin, it will shift the viewing angle of the refracted colored image away from the light source, creating a contrasting image to the refracted color in the adjacent unprinted area. It was further found that since each transparent glass microsphere embedded in the microsphere bonding layer acts as a catadioptric lens which converges the light rays entering through the transparent substrate it was possible to control the thickness of the one or more transparent coating(s) on the exposed surface of some of the glass microspheres to achieve the focal point of the lens wherein the yellow portion of the spectrum is converged on the back surface of the coating(s). This appears to act as an achromatic doublet lens to reverse the chromatic aberration caused by the dispersion of the light in the microsphere. If a transparent and colorless coating(s) is used of sufficient thickness and refractive index to achieve this lens focal point, a retroreflected image results which is brighter than the etched appearance of the uncoated microspheres when the viewing angles are less than the range where the prismatic display may be observed (nearer the light source). At the same time, this image appears darker than the unprinted background at the viewing angles where the prismatic display may be observed. At viewing angles greater than the viewing range of the prismatic display, the coated and uncoated microspheres appear almost the same, meaning the image largely disappears. If the coating thickness is increased beyond this lens focal point on some of the microspheres, more incident light is transmitted, and a transparent image results which creates a dark contrast to the unprinted areas under all viewing angles. Finally, because of the angular dependence of these images on coating thickness, it was possible to create an illusion of depth or three-dimensionality, by proper choice of image and image position, i.e., such as by use of a drop shadow.

The aforesaid coating(s) could be present on any or all of the previously described embodiments to contribute to the decorative nature of the images.

Under certain conditions, using the aforesaid method to coat some of the microspheres with one or more images can provide a second decorative article. A second decorative article results when the entire surface of the transparent substrate is provided with a continuous layer of microspheres bonded via a transparent bonding layer and one or more images is formed thereon by said coating(s). The second decorative article comprises:

(a) a transparent substrate;

(b) a continuous layer of transparent solid glass microspheres bonded to one side of the transparent substrate by a transparent microsphere bonding layer, wherein the nicrospheres are partially embedded in the transparent microsphere bonding layer, wherein, about 20% to about 80% of the average diameter of each microsphere is embedded in the transparent microsphere bonding layer, and wherein the ratio of the transparent microsphere refractive index to the microsphere bonding layer refractive index is about 1.3:1 to about 1.7:1;

(c) at least one coating on some of the microspheres wherein said coating(s) is on the surfaces of the microspheres not embedded in the transparent bonding layer;

(d) an optional transparent adhesive layer affixed between the transparent substrate and the transparent microsphere bonding layer; and (e) an optional transparent reinforcing layer affixed between the microsphere bonding layer and the optional transparent adhesive layer, when present.

In the present invention, the ability to use a transfer graphic article depends upon the proper balance of the adhesive and cohesive forces between the various layers. Within the scope of the invention is envisioned the use of pressure-sensitives, or heat activated adhesives, or solvent activated adhesives, for the transfer carrier and/or the bonding layer affixing the graphic to the article.

The term "retroreflection" as used herein refers to the property wherein radiation is returned in, or close to, the direction from which it came, this property being maintained over wide variations in the direction of the incident radiation.

The term "transparent" as used herein refers to a material wherein the ratio of the intensity of undeviated light passing through a bulk layer to the incident light is equal to or greater than about 85%.

The term "opaque" as used herein refers to a material wherein the ratio of the intensity of undeviated light passing through a bulk layer to the incident light is equal to or less than about 20%.

The term "translucent" as used herein refers to a material wherein the ratio of the intensity of undeviated light passing through a bulk layer to the incident light is less than about 85% but greater than about 20%.

The term "lens focal point" as used herein refers to the condition whereby the yellow portion of the spectrum of the incident white light transmitted through the transparent substrate is converged by the catadioptric lens system created by the glass microspheres embedded in the microsphere bonding layer to the back surface of one or more coating(s) formed thereon, to result in a contrasting image visible near the light source.

The term "formed" as used herein includes the terms "coated," "extrudes," "transfer coated," "laminated," etc.

BRIEF DESCRIPTION OF THE DRAWINGS

FIG. 6 is a light ray diagram which illustrates how the off angle prismatic display results from the decorative article of the invention.

FIG. 7 is a light ray diagram which illustrates why the microspheres should not be embedded to a depth less than about 20% of their diameter in the transparent bonding layer of a decorative article.

DETAILED DESCRIPTION OF THE INVENTION

Transparent Glass Microspheres

Figure 1A:
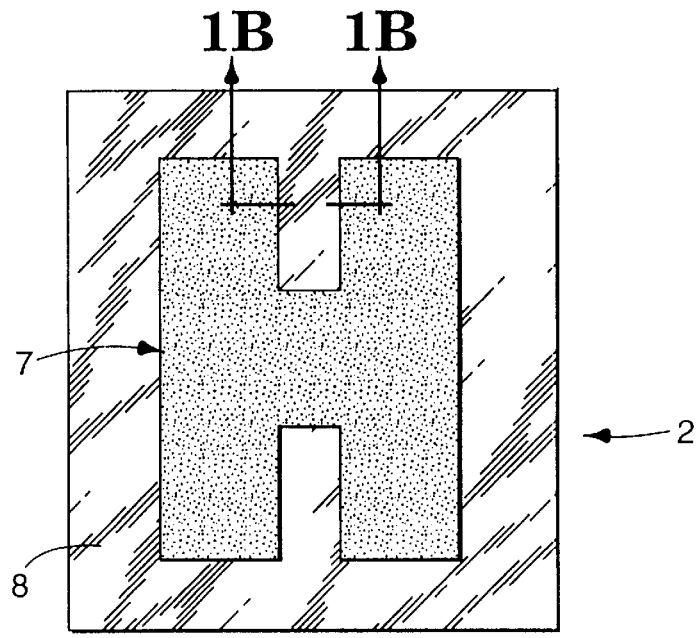
FIG. 1A is a front view of a decorative article of the invention having a monolayer of transparent glass microspheres in the form of an image affixed to a transparent substrate via a transparent microsphere bonding layer. The front view illustrates the article's etched appearance.

The transparent glass microspheres are preferably colorless. Transparent colored or slightly colored microspheres may be useful but they would tend to filter out certain colors. The transparent microspheres must be solid rather than hollow. The microspheres are preferably free from flaws and imperfections. Due to processing difficulties, the microspheres may possess some minor flaws such as phase separation, crystallinity and haziness. The greater the number of microspheres containing flaws the lower the color intensity of the prismatic display. It is also possible that a small number of hollow microspheres may be produced along with the solid microspheres due to processing difficulties. The decorative article could still be prepared without separating out the minor amount of hollow microspheres. However, these hollow microspheres would not contribute to the prismatic display.

The diameters of the transparent microspheres can vary. Typically, the average diameter of the transparent microspheres ranges from about 5 to about 200 microns, preferably about 40 to about 150 microns, and most preferably about 60 to about 90 microns. As the average diameter of the microspheres is reduced below about 60 microns, diffractive effects can occur which tend to reduce the saturation of color (i.e., a milky color results.) If the average diameter of the microspheres is greater than about 200 microns, the microspheres become more visible to the naked eye thus lessening the diffuse nature of the etched appearance. In addition, the prismatic display appears somewhat less continuous with increase in microsphere diameter. Also, larger microspheres tend to be less cost effective as they cover less area on a weight basis and can require a greater amount of bonding material to adhere to the transparent substrate. Typically, microspheres are used which differ in diameter by not more than about 60 microns, preferably not more than about 30 microns, and most preferably not more than about 20 microns, in order to obtain a more uniform appearing etched appearance and a prismatic display having vibrant colors. However, depending upon the effect desired, one may wish to use microspheres having greater differences in diameter, or use microsphere populations of differing mean diameter in different portions of the image.

The refractive indices of the transparent microspheres can vary as long as the ratio of the refractive index of the microspheres to the refractive index of the transparent bonding layer falls within the indicated range. The refractive index of the microspheres is typically at least about 1.93 for availability reasons of the microsphere bonding layer, more typically about 2.1 to about 2.3.

The transparent microspheres may be treated with adhesion promoters such as silanes, titanates, chromates or the like to improve adhesion to the transparent bonding layer. They may also be treated with surface energy lowering coatings such as silicones or fluorocarbons to help control the embedment process.

Transparent Microsphere Bonding Layer

The transparent microsphere bonding layer should be capable of adhering to the microspheres and to the transparent substrate or optional layers, if present, such that the decorative article surface can be scrubbed without debonding. The bonding layer is preferably insoluble in or, unaffected by normal cleaning materials such as water, alcohol, surfactants, etc. The microsphere bonding layer preferably is capable of adhering the microspheres to the intended substrate over a fairly wide temperature range (i.e., about −45° C. to about 70° C.). The microsphere bonding layer should be capable of being processed such that the microspheres can be embedded to the proper depth. Typically, the bonding material is either soluble or dispersible in a solvent from which it can be cast, or is capable of being cast via thermoplastic extrusion. The transparent bonding layer is typically colorless but may be colored, depending on the decorative affect desired.

The transparent microsphere bonding layer can comprise a number of different materials. The bonding material may be solvent-based, water-based or a 100% solids resin. The bonding layer may be, for example, a thermoplastic or thermosetting material. Crosslinked materials generally provide better solvent resistance, humidity resistance, and temperature stability. It may, for example, be an adhesive although a pressure-sensitive adhesive would be less advantageous since it would tend to attract dust, etc. Preferably the microspheres are "intimately bonded" via the microsphere bonding layer to the intended material. By "intimately bonded" it is meant that the bonding layer is free of discontinuities such as air bubbles which disrupt the continuity of the appearance. Preferably any optional layers are intimately bonded to the other materials and/or layers also.

Suitable bonding materials include but are not limited to those selected from the group consisting of polyurethanes; acrylic polymers and copolymers such as polymethyl methacrylate, etc.; modified acrylic polymers and copolymers such as polyethylene acrylic acid, polyethylene methacrylic acid and its metal salt modified polymers; polyesters such as polyvinyl acetate, etc.; polycarbonates; epoxies; polyethers; vinyl copolymers; melamine polyesters; modified melamine polyesters such as butylated melamine polyesters, etc.; fluoropolymers; blends thereof etc. Preferably the transparent bonding layer is selected from the group consisting of melamine modified polyesters (for weatherability and processing reasons), acrylic polymers and copolymers, polyurethanes, and blends thereof.

Figure 16:
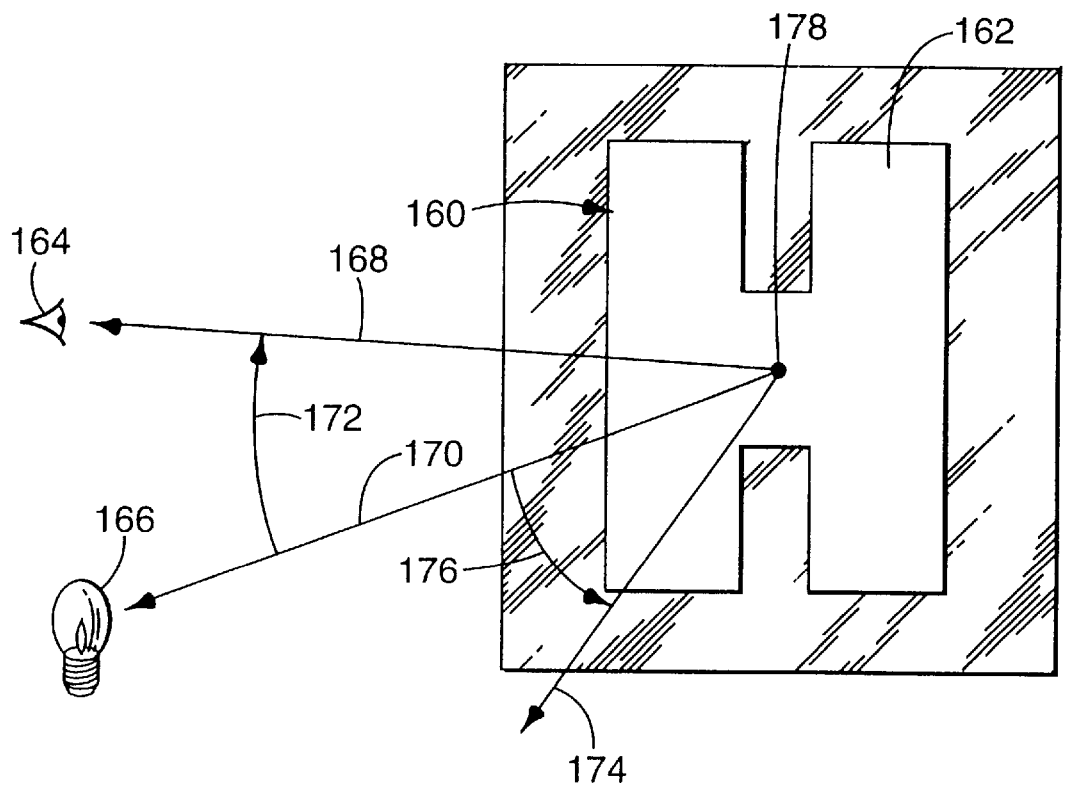
FIG. 16 is an illustration of the viewing conditions for the prismatic display produced by the decorative article of FIG. 1C.

The refractive index of the bonding layer can vary as long as the ratio of the transparent microsphere refractive index to the transparent bonding layer refractive index is about 1.3:1 to about 1.7:1. This ratio is important because it determines where a viewer will observe the prismatic display. For one to observe the prismatic display a source of light must illuminate the microsphere containing image on the second surface of the transparent substrate. The geometric orientation of the illumination source, substrate and viewer is important in designing the visual decorative effects of the decorative article of the invention. For definition purposes geometric conventions similar to those used in the art of retroreflective optics are followed herein. These can be found in the CIE Publication 54 and in ASTM standard E-808. Herein, the term "retroreflector" used within the CIE convention has been replaced with the term "substrate", meaning the transparent substrate on which the image of the invention is present to define the article of the invention. A brief synopsis of the important definitions used herein are as follows: Referring to FIG. 16, the substrate center 178 is a point on a substrate 160 which is designated to be the center of the device for the purpose of specifying its performance. The illumination axis 170 is defined as a line segment from the substrate center 178 and the source of illumination 166. The observation axis 168 is defined as a line segment between the substrate center 178 to the observer 164. The substrate axis 174 is a perpendicular line segment from the substrate center 178 which is used to define the angular position of the substrate 160. The entrance angle 176 (also herein referred to as the illumination angle) is the angle from the illumination axis 170 to the substrate axis 174. The observation angle 172 (also referred to herein as the viewer or viewing angle) is the angle between the illumination axis 170 and the observation axis 168.

The light emitted by the illumination source passes, in sequence, through the transparent substrate, the optional transparent adhesive and reinforcing layers (if present), the transparent microsphere bonding layer, and the microspheres. The microspheres disperse the light into the visible spectrum and a portion of it is refracted back at an angle different from the illumination angle, where it may be observed. It has been discovered that for any given ratio of microsphere refractive index to microsphere bonding layer index within the aforesaid limits, a prismatic display is visible in a radially symmetric cone segment or annular viewing ring which is about 15–20 observation angle degrees wide, when the illumination angle is fixed at 0 degrees. This is believed to be due to the spherical nature of the microspheres. The lower angle within any given viewing ring corresponds to the shorter wavelength violet color of the spectrum and the higher angle to the higher wavelength red color of the spectrum, with the remaining spectral colors observed between the limits. To study this effect a series of varying reference refractive index liquids to substitute for the microsphere bonding layer was used. These appear to correlate well to a solid microsphere bonding layer, but provided a convenient means of varying the refractive index only. It was discovered that at the lower aforesaid ratio of 1.3:1 the annular viewing ring approaches 90 degrees observation angle and therefore is a lower practical limit. The higher aforesaid ratio of 1.7:1 defines an annular viewing ring that approaches 0 degrees observation angle and is therefore an upper practical limit. This effect does not appear to be linear, i.e., higher refractive index microspheres have slightly higher ratios for a given viewing angle range. The preferred range of the aforesaid ratio is between about 1.35–1.55, which corresponds to observation angles of the red color of the spectrum from about 65–25 degrees respectively. The following table provides information which allows one to choose the refractive indices of the microsphere bonding layer and/or microspheres to help design a starting point to define the angular range where the prismatic display is observed.

| Microsphere R.I./ Reference Liquid | | Observed Angle of Color* | | | | |
| --- | --- | --- | --- | --- | --- | --- |
| R.I. | Ratio | Violet | Blue | Green | Yellow | Red |
| 1.93/1.400 | 1.38 | 39 | 44 | 49 | 52 | 59 |
| 1.93/1.448 | 1.33 | 55 | 60/1 | 64 | 68 | 52 |
| 1.93/1.496 | 1.29 | | No Spectrum Observed | | | |
| 2.10/1.400 | 1.50 | 14 | 18 | 22 | 25 | 30/31 |
| 2.10/1.448 | 1.45 | 22 | 26 | 30 | 33 | 38/39 |
| 2.10/1.496 | 1.40 | 30 | 34 | 38/39 | 41/42 | 48 |
| 2.10/1.516 | 1.38 | 35 | 39 | 44/45 | 47/48 | 52/53 |

-continued

| Microsphere R.I./ Reference Liquid | | Observed Angle of Color* | | | | |
|---|---|---|---|---|---|---|
| R.I. | Ratio | Violet | Blue | Green | Yellow | Red |
| 2.10/1.544 | 1.36 | 42/3 | 46/7 | 51 | 54/55 | 60 |
| 2.10/1.592 | 1.32 | 56 | 61 | 66 | 71 | N.O. |
| 2.10/1.640 | 1.28 | | No Spectrum Observed | | | |
| 2.19/1.400 | 1.56 | 10 | 15 | 20 | 23 | 26/27 |
| 2.19/1.448 | 1.51 | 19 | 24 | 28/29 | 30/31 | 35 |
| 2.19/1.496 | 1.46 | 28 | 32 | 36/37 | 39/40 | 45 |
| 2.19/1.516 | 1.44 | 31 | 35 | 41/42 | 45 | 49 |
| 2.19/1.544 | 1.42 | 41/42 | 45/46 | 49 | 52/53 | 56 |
| 2.19/1.592 | 1.38 | 55 | 60 | 65/66 | 68 | 71 |
| 2.19/1.644 | 1.33 | | No Spectrum Observed | | | |
| 2.26/1.400 | 1.61 | 7/8 | 11 | 16/17 | 18/19 | 21/22 |
| 2.26/1.448 | 1.56 | 16/7 | 19/20 | 22/23 | 24/25 | 28 |
| 2.26/1.496 | 1.51 | 22 | 26 | 29/30 | 32/33 | 36 |
| 2.26/1.516 | 1.49 | 26 | 30 | 34 | 36/37 | 39 |
| 2.26/1.544 | 1.46 | 33 | 35/46 | 39 | 42/43 | 44/45 |
| 2.26/1.592 | 1.42 | 42 | 46/47 | 50 | 53/54 | 57 |
| 2.26/1.644 | 1.38 | 58 | 61 | 66 | 71 | 75/76 |
| 2.26/1.692 | 1.33 | | No Spectrum Observed | | | |
| 2.60**/1.40 | 1.86 | N.O. | N.O. | N.O. | N.O. | N.O. |
| 2.60**/1.448 | 1.80 | N.O. | N.O. | N.O. | N.O. | N.O. |
| 2.60**/1.495 | 1.73 | N.O. | N.O. | 3/4 | 7 | 11 |
| 2.60**/1.516 | 1.71 | N.O. | 0–2 | 5/6 | 9 | 13 |
| 2.60**/1.544 | 1.68 | N.O. | 0–5 | 8/9 | 11/12 | 15 |
| 2.60**/1.592 | 1.63 | 5 | 11 | 15/16 | 19 | 21 |
| 2.60**/1.644 | 1.58 | 10 | 14 | 17/18 | 21 | 23/24 |
| 2.60**/1.692 | 1.54 | 16/17 | 21/22 | 25 | 28 | 30 |

N.O. = No Color Observed
R.I. = Refractive Index
*In degrees
**The available transparent microsphere for this range of refractive index was yellow in color so the stated angles are approximations only.

When a viewer is standing within the viewing ring for a single combination of the aforesaid refractive indices the portion of the spectrum that the viewer sees, and the relative position of the colors (if more than one color is visible at the same time) is dependent on the area of illumination, the size of the area containing the aforesaid microspheres within the area of illumination and the relative distance of the viewer and the light source from the second surface exposed monolayer of microspheres to define the aforesaid observation angle range.

A method of defining what the viewer will see from a given position is as follows: Draw a two-dimensional diagram of the viewing situation using proportional spacing for the substrate, the width of the substrate microsphere image portion, the illumination width (if smaller than the width of the microsphere image), the illumination source position and distance, and the viewer position and distance. Draw two line segments from the center of the light source to the edges of the illuminated portion of the microsphere containing substrate surface closest to the viewer and furthest from the viewer. Next, draw two line segments from each of these points to the viewer's eye. Measure each of these observation angle limits. Compare these angles to the aforesaid table for a similar refractive index ratio combination. If both angles are within the range of the prismatic viewing ring the lower of the two measured angles will approximate the shortest wavelength color of the spectrum (violet side) that the viewer will see from that position, while the higher will determine the longest wavelength color.

If the source of illumination is very much further away from the microsphere display surface than the viewer, (i.e., such as when the illumination source is the sun), the viewer distance along the observation axis, the size of the area containing the microspheres, along with the presence of any shading source define the size of the display and the number of colors visible from a given point. Given the great distance of the sun from the display surface the illumination angle doesn't appreciably vary from one side of a display to the other, thus, the change in observation angle is largely dependent on the viewer distance. The maximum width of a complete spectral display for the sun as a light source appears to be about one third the observation distance along the observation axis. Thus, for example, a viewer positioned in the center of prismatic viewing ring about 3 meters from the center of a display surface of the invention which is illuminated by the sun could see a spectral band as wide as about 1 meter wide, assuming the illuminated surface was unshaded and the area containing the microspheres was at least one meter wide. If the sun is to the right of the observer's back when the observer is in the viewing ring, and the display area is large enough, (or the observer is close enough), such that more than one color is seen simultaneously, the longer wavelength colors will be on the right side of the illuminated area (toward the light source side) and the shorter wavelength colors will be on the left side of the illuminated area (away from the light source side). If the sun is to the left of the observer, then the longer wavelength colors will be on the left side of the display (again, toward the light source side) and the shorter wavelength colors will be on the right side of the display. This is due to the fact that when the light source is further away from the display than the observer, the observation angles on the side of the illuminated display toward the light source are always higher than the observation angles on the side of the illuminated display away from the light source. Under these same conditions, if the viewer walked along the observation angle axis toward the display, the visible spectrum area would become smaller, until the whole spectrum could be seen. As the viewer approaches still closer along the observation axis, the spectrum width eventually becomes smaller than the area containing microspheres, in which case the diffuse etched appearance is visible on either side of the prismatic display.

If the source of illumination is closer than the viewer, i.e. such as when the display is illuminated by the headlights of a vehicle which is closer to the microsphere display than a viewer, then the relative position of the colors seen within the ring of the prismatic display is the reverse, owing to the fact that, under this condition the lower observation angles are always on the side of the display toward the light source. Also under this condition, the spectrum width of the display becomes smaller as the light source moves closer to the microsphere containing display surface, along the illumination axis.

When the light source distance along its axis is the same as the viewer distance along the observation axis, the viewer will see one color at any given point across the entire illuminated area containing the microsphere image. From this point, any movement of the light source along the illumination axis or of the viewer, along the observation axis, in either direction, will result in an increase in the number of colors seen in the illuminated area.

The thickness of the transparent microsphere bonding layer into which the transparent microspheres are embedded can vary. The coating must be thick enough such that the microspheres can be embedded to a depth of at least about 20% of the average diameter. There is no maximum thickness of the microsphere bonding layer as long as transparency is maintained.

The transparent microspheres should be embedded in the transparent bonding layer such that about 20% to about 80% of the average diameter is embedded, preferably about 30 to about 70%, most preferably about 40 to about 60%. If less than about 20% of the average diameter is embedded most of the prismatic display will be lost due to multiple internal reflections of the refracted light within each microsphere. Also, microspheres embedded at less than about 20% of the average diameter would be more likely to become detached from the substrate. If the microsphere layer is embedded too deeply, a prismatic display is not observed at higher illumination angles. Preferably, the only microspheres present are those partially embedded in the microsphere bonding layer. If some microspheres are completely embedded in the microsphere bonding layer, it will interfere with the prismatic display. The closer the refractive index of such completely embedded microspheres to the R.I. of the microsphere bonding layer, the less the interference.

Transparent Substrate

The transparent substrate useful in forming the decorative article of the invention may be rigid or flexible. Preferably, the substrate is outdoor weatherable. The transparent substrate can be formed from a variety of materials including, but not limited to, those selected from the group consisting of glass; plastics such acrylic polymers and copolymers such as polymethylmethacrylate ethylene/acrylic acid copolymers, impact resistant cast acrylics, such as Plexiglas® polyacrylic available from Rohm and Haas, polycarbonates such as Lexon® polycarbonate available from General Electric, polyvinylchloride, polyvinylacetate, cellophane film, polyethylene terephthalate, etc., and elastomers such as polyurethane. Preferably, the transparent substrate is formed from a material selected from the group consisting of glass and transparent plastics such as polyacrylics and polycarbonates. The transparent substrate can take a number of different forms including two-dimensional symmetrical objects such as window panes, mirrors, etc., and three-dimensional symmetrical objects such as cubes, spheres, rectangular objects, etc., as well as asymmetrical objects. Specific examples thereof include objets d'art such as sculptures, etc.; vases; lamps; signage; etc.

The elements of the decorative article of the invention, as well as graphic media and transfer graphics from which they may be formed, can be varied to obtain the desired appearance. For example, transparent microspheres having different refractive indices can be separately bonded via the transparent bonding layer to different sections of the transparent substrate (i.e. on adjacent strips or areas, for example), to provide for a color contrast. Thus, when one section of the image is refracting the color blue to the viewer, for example, an adjacent section may be reflecting red, for example. This color contrast is a highly desirable feature and can be used to create the illusion of depth. Or the refractive index ratio of the microspheres to the bonding layer may be chosen so that the adjacent images are prismatically active at entirely different viewing angle ranges rather than overlapping viewing angle ranges to extend the viewing range of the display. In this way overlapping or multiple prismatic displays may be observed.

Another way to obtain the appearance described above (i.e. adjacent sections of contrasting color) is to coat microspheres of the same refractive index onto adjacent sections of bonding layers, which sections of bonding layer have different refractive indices. The same desirable type of color contrast and illusion of depth would be obtained.

Another means of altering the appearance of the decorative article involves bonding microsphere populations of the same refractive index, but of different average diameters, in sections (i.e., on adjacent strips or areas, for example) to a bonding layer having just one refractive index. The contrast observed would be due to diffraction, i.e., the area having the smaller microsphere population will have a lighter etched appearance than the area having the larger microsphere population. Within the viewing angles of the prismatic display, the smaller microsphere population will have the same hue at a given angle, but with a higher color value and lower chroma than the larger microsphere population, especially as the population average is reduced below about 60 microns.

Another means of altering the appearance of the decorative article involves mixing together microsphere populations of about the same diameter, but of different refractive indices, which are then bonded to the transparent substrate. The image observed by a viewer would be either two or more separate prismatic displays or two or more overlapping prismatic displays, depending upon the difference in refractive indices of the microsphere populations.

Another means of altering appearance would be to use multiple light sources at different illumination angles or light sources that move from one illumination angle to another, relative to a stationary viewer.

The appearance of the article of the invention can also be altered by coating the surfaces of some of the exposed microspheres (i.e., the non-embedded surfaces which protrude out of the transparent microsphere bonding layer) with one or more images which are intended to contrast with the adjacent uncoated, exposed microspheres. The coating may be of similar composition and properties as the microsphere bonding layer discussed previously. If two coatings are present, one may be a positive image and another, a negative image. One or more coatings may be applied. The coating or combination of coatings may vary in thickness or may have the same thickness when two coatings are present. One may be transparent and colorless and one may be transparent and colored, although other alternatives are possible. If at least one of the coatings is a colored opaque or translucent printing ink, the image thus created is visible at all viewing angles and creates a contrast to the uncoated area. If the viewer is positioned where the microspheres are prismatically active the color of the opaque or translucent ink image is in color contrast to the prismatic display. If the viewer is not positioned in the annular ring of the prismatic display, the ink image is in contrast to the etched appearance. Although the thickness of the coating can vary in areas, it is typically about ⅕ to about 1/50 of the average diameter of the microspheres.

If the coating used to coat an image on some of the exposed beads is transparent and colorless, it has been observed that the type of visual contrast created is very dependent on the thickness of the coating. (For the description of these visual effects a transparent coating with about a 1.5 refractive index was coated via a screen printing method on the exposed surface of a 2.26 refractive index microsphere layer embedded in a 1.54 refractive index microsphere bonding layer.) If the thickness of the transparent coating image is great enough, such that the spherical contours are buried and the surface is flat, then that image area becomes transparent at all viewing angles and the prismatic display is eliminated. This means that if the viewer is at a viewing angle where the uncoated microspheres are prismatically active, a contrast is created between the prismatic display and the relatively darker image of the thick transparent coating. If the viewer is positioned outside the annular ring of the prismatic display, a relatively dark contrast is created with the light diffuse etched appearance of the uncoated microspheres.

If the transparent colorless coating is thinner than the condition described above, such that the spherical contour of the surface is maintained, two types of visual contrast have been observed. If the transparent coating is very thin, i.e., for this particular case, on the order of about one-tenth of the diameter of the microspheres or less, it interferes with the refraction angle and increases the viewing angle of the prismatic display i.e., it shifts the prismatic display away from the light source several degrees, thereby creating a color contrast with the adjacent uncoated areas of the image which exhibit a different color at the same viewing angle. If the viewer is positioned at a viewing angle range less than that of the prismatic display, this thin coating is darker in color than the unprinted area. If the viewing angle is greater than the prismatic display, the printed image largely disappears. On the other hand, if the display is illuminated from behind, the printed area is lighter than the unprinted area, i.e., it transmits more light.

When the aforesaid coating was printed even thinner (less than about 1/20 the average diameter of the microspheres) through dilution with solvent and use of a higher mesh screen, it became barely visible, except within the viewing range of the prismatic display. Use of a thin transparent coating such as this provides the ability to create a hidden image or watermark effect, wherein the image is only visible within the viewing angle range of the prismatic display, where it surprisingly and suddenly appears to the viewer as their position changes relative to any illumination source.

As the coating thickness of said transparent coating image was increased beyond the order of one-tenth the diameter of the microspheres, while still preserving the spherical shape of the surface, the color of its prismatic display was seen to decrease and darken relative to the uncoated areas, i.e. the width of its prismatic display angular range was reduced and shifted to slightly higher viewing angles by several more degrees. At the same time the brightness of the image increased as the viewer moved outside the prismatic display range and nearer the illumination source. This created a more visible contrast to the etched appearance of the uncoated microspheres. Additionally, the brighter image was observed to be a photographic negative of the image observed within the annular ring of the prismatic display. Therefore, a viewer who starts near an illumination axis and then moves away from the light source, increasing their viewing angle such that they progress into, and then through the range of the prismatic display, the aforesaid image can be seen to flip dramatically from a photographic negative to positive and then largely disappear at higher viewing angles. If the viewer moves in the opposite direction, the reverse is seen. The same effect is also achieved by moving the illumination source while the viewer and substrate remain stationary, or by moving the substrate and holding the viewer and illumination source stationary.

After discovering these surprising effects and considering their physical implications, it is theorized that the shifting of the prismatic display to present different viewing angles and the enhanced brightness as a function of increasing coating thickness is affected by many interrelated variables. First, the relative difference between the refractive index of the microspheres and the transparent coating affects the direction, and degree of the viewing angle shift at a given coating thickness. The shift to higher viewing angles when a thin transparent material is coated on some of the exposed microspheres is believed to be due to the fact that the available organic coating had a refractive index lower than the refractive index of the microspheres. If a transparent coating was available which had a higher refractive index than the microspheres, it is theorized that it would decrease the viewing angle of the prismatic display. Furthermore, a thin coating with a greater difference in refractive index from the microspheres would, it is theorized, produce a greater shift at the same coating thickness as a coating with a smaller difference (as long as the spherical nature of the surface is maintained). Thus, for any two different transparent coatings with refractive indices less than a given microsphere refractive index, it is believed that the coating with the lower refractive index will cause a greater increase in viewing angle at the same thickness and vice versa.

Furthermore, given the nature of lens chromatic aberration, a larger average microsphere diameter will require a thicker transparent coating of a given refractive index than a smaller microsphere of the same refractive index to produce the same viewing angle shift. Also, a narrower microsphere diameter range distribution would provide more precise control of the coating thickness and therefore, the prismatic effect than a wide distribution.

As the thickness of the transparent coating is increased, the observed loss of color within the viewing angles of the prismatic display, and the appearance of increasing brightness nearer the illumination source, is believed to be due to the approach of the lens system created by the microsphere and the coating (which somewhat conforms to the spherical shape of the microsphere) to what is referred to in the art of optics as the lens focal point. As the lens focal point is approached, a reversal of the color dispersion caused by the higher index glass microsphere appears to takes place with a conversion of at least a portion of that dispersed light to a retroreflected image. Unlike a conventional retroreflective microsphere containing sheeting, which requires a metallic mirror or dielectric reflector coat on the backside of the spherically shaped surface, the above lens system of the invention at the focal point is less efficient, meaning a higher portion of the incident light is lost through the second surface relative to light returned. Furthermore, it also appears to be more scattered, since the increase in brightness can be observed over a fairly broad range compared with the narrow, intense cone of a typical retroreflective microsphere containing sheeting. However, the amount of light returned is still sufficient to create a visual effect and furthermore, the present invention provides a much broader viewing range than retroreflective sheeting.

The maximum color shift which should be obtainable via the process of coating a thin transparent coating on the exposed surface of the microspheres for a given combination of microsphere and microsphere bonding layer refractive index is difficult to define. It is theorized that the shift cannot be any larger than the width of the annular prismatic display defined by the microsphere and microsphere bonding layer refractive index ratio, i.e., 15–20 degrees. Although actual observed shift in the limited range of materials observed to date has been limited to about 5 degrees. It is believed that as the transparent coating thickness on the microspheres increases, the valleys in between the microspheres begin filling up and therefore, as one proceeds from the illumination source toward higher viewing angles, the portion of the microsphere surface involved in the reflection of the refracted light, which is naturally further away from the apex because of increasing refraction angle, becomes covered by the coating filling the valleys. It is therefore possible that higher viewing angle shifts would take place if the coating was only present on the upper portion of the microspheres, or if the bead embedment was low such that a larger reservoir exists in the valleys between the microspheres. It is believed that all such methods of adjusting the coating to optimize the resulting desired decorative effects can be used.

Definition of the exact limits of the above described effects for purposes of the specification is further complicated by the variables inherent in the process of coating on a spherically shaped surface, where the coating thickness can vary from the apex of the microspheres to the valleys in between, as well as variables caused by printing method, shrinkage characteristics and evaporative rates of the chosen coating. One skilled in the art of printing should be able to quickly define the ideal coating and process variables empirically, given the above description of potential effects and reference to the examples herein provided. A suggested starting point would be to choose a transparent coating of the same type as the transparent microsphere bonding layer itself. For a subtle watermark effect, one starts at the minimum dilution level allowed by the chosen printing process, and adjusts the printing parameters to minimize coating thickness on the microspheres and observes the visual effects relative to the desired effect. If the result is more subtle than desired, the process and dilution strength would be adjusted to result in a thicker coating or vice versa. If a lens focal point is desired, one increases the coating thickness until the desired amount of highlight is seen near the illumination source. If contrast at all viewing angles is desired, then the coating thickness is increased further, such that the spherical surface is flattened, wherein the image will become transparent and appear darker than the adjacent uncoated areas.

An additional visual effect can be created when the thin transparent coating is colored with a finely dispersed pigment or dye which will retain sufficient transparency to not mask the prismatic display. In this case, the chosen color will act as a filter for the color of the prismatic display. For example, if the colored transparent coating is red, the prismatic display will enhance the red color at the viewing angle where red is refracted. At the viewing angle where blue is refracted, the red and blue will mix to result in a purple color and so on. The actual color will vary depending on the level of transparent red pigment, its hue and color strength and the intensity of the illumination source. For example, a strong red color will be less affected by the prismatic display at low illumination. If one chooses to use a larger diameter microsphere and a lower viscosity coating, the valleys in between the microspheres can allow a fairly thick color coat reservoir, while still maintaining the spherical shape of the surface and hence the prismatic display. This is particularly effective for darker pigments such as carbon black.

Still further complex visual effects can be obtained by varying the thickness of the transparent coating on some of the microspheres relative to the others while leaving still others uncoated, or by using colored coating(s) in combination with colorless coating(s). The aforesaid coating variation can be achieved by overprinting a portion of the image with one or more additional layers or by printing a graduated halftone, diffusion dither halftone or stochastic halftone which distributes a greater or lesser amount of coating depending on the type of printing method. For example, when a graduated halftone is screen printed the screen masking is photographically developed to result in more or less open screen area in different image areas. By proper choice of coating refractive index, dilution strength and screen mesh, one can vary the thickness of the coating between the range of visual effects described above in less printing steps, such that portions of the image have subtle contrast, portions are at the lens focal point, and portions are transparent. Since the color contrast changes as a function of viewing angle, one can also provide pseudo 3-dimensional effects by the printing of drop shadows with varying coating thickness or by generating graduated grayscale halftone screens from photographs of 3-dimensional objects. For example, if a positive image of a grayscale converted photograph is printed with a colored transparent ink and then overprinted with the negative grayscale converted image using a colorless ink, wherein the second image is printed slightly off-register, a 3-dimensional effect can be created. Still other effects are possible given the disclosure of the above-described principles of controlling the dispersed color and the etched appearance.

Examples of suitable coatings include but are not limited to those selected from the same group as the aforesaid transparent microsphere bonding layer. If the coating is to be colored via addition of dispersed pigments or dyes, as is well known in the graphics arts industry, a preferred group of coatings would include vinyl polymers or vinyl copolymers; acrylic polymers or copolymers; vinyl/acrylic blends, polyurethanes; polyesters; epoxies and other materials which are capable of dispersing pigments or are typically compatible with dyes. Adhesion promoters such as silanes, titanates, organo-chromium complexes or the like may be added to improve adhesion to the glass microsphere surface.

Transparent Adhesive

A layer of transparent adhesive may be affixed between the release liner and transparent microsphere bonding layer, for the graphic media, imaged graphic media or transfer graphic of the invention. The transparent adhesive layer would thus be positioned in between the transparent microsphere bonding layer and transparent substrate in a decorative article prepared therefrom. The transparent adhesive may be used in situations where the transparent microsphere bonding layer does not have sufficient adhesive strength to adhere to the transparent substrate or to provide more flexibility in application method, such as by use of a pressure-sensitive adhesive. The transparent adhesives may be permanent, repositionable, etc. depending upon the application. The term transparent adhesive as used herein also includes adhesive films which may be permanent, repositionable, and etc. An easily removable and repositionable adhesive would be useful for providing temporary decorative articles.

Examples of suitable transparent adhesives include but are not limited to those selected from the group consisting of acrylic polymers and copolymers, such as isooctyl acrylate/ acrylic acid copolymers, modified acrylic copolymers, polyesters such as polyvinyl acetate, and its copolymers, polyurethanes, epoxies, highly plasticized vinyls or vinyl copolymers, copolymers of ethylene with acrylic acid and methacrylic acid and its metal salt modified polymers. This layer does not play a role in the prismatic display other than to provide a transparent bond with the substrate. The viewing angle of the prismatic display is not related to the refractive index of this layer.

Transparent Reinforcing Film

A transparent reinforcing film may be adhered between the transparent adhesive and the transparent bonding layer for the graphic media, imaged graphic media or transfer graphics of the invention. The transparent reinforcing film would thus be positioned between the transparent microsphere bonding layer and the transparent adhesive in a decorative article prepared therefrom. It should not be present unless the transparent adhesive layer was present. The purpose of such a film is to reinforce the construction such that it can undergo graphic imaging processes such as die cutting, weeding, and substrate application handling. The film should preferably demonstrate flexibility and tear resistance in addition to its transparency. Its modulus would offset the modulus of the transparent microsphere bonding layer and the substrate adhesive layer. For example, if the transparent microsphere bonding layer is hard and brittle and the transparent adhesive is a soft pressure-sensitive type, the reinforcing layer should have a modulus in between both to facilitate processing.

Examples of suitable transparent reinforcing layers include but are not limited to those selected from the group consisting of elastomers, polyolefins, polyurethanes, polyesters, impact modified acrylics, plasticized vinyls, etc. If both the transparent microsphere bonding layer and transparent adhesive have a low modulus, then a reinforcing layer with a higher modulus would be chosen to facilitate handling. As with the optional transparent adhesive layer, this optional layer does not effect the viewing angle of the prismatic display.

Release Liner

The release liner useful in the graphic media and transfer graphics of the invention can be formed from a variety of materials including, but not limited to, those selected from the group consisting of silicone coated paper or film, fluorocarbon coated paper or film, polyethylene or polypropylene coated paper or film and polyester terephthalate film. The primary requirement of this layer is to demonstrate low peel adhesion to the transfer carrier and transfer graphic to allow separation. It must also meet the handling requirements of die cutting and weeding processes required for imaging the transfer graphic.

The present invention will be better understood by referring to FIGS. 1 to 16.

FIG. 1A is a front view of an embodiment of the decorative article 2 of the invention. A layer of transparent solid glass microspheres 4 are bonded to a transparent substrate 8 in the form of the letter "H" identified as 7 on one surface of the substrate 8. To an observer on the other side of the substrate 8, the article 2 would have the appearance of etched glass or a prismatic display, depending upon the viewing angle, relative to a source of illumination.

Figure 1B:
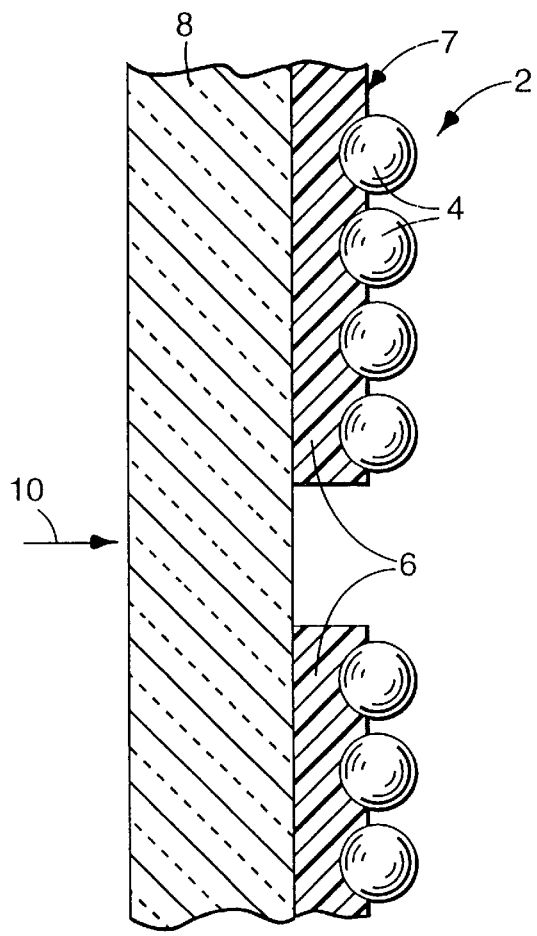
FIG. 1B is a cross-section of the decorative article of FIG. 1A which can be made from the graphic media of FIG. 3.

FIG. 1B is an enlargement of a cross-section of the decorative article of FIG. 1A. The imaged monolayer of high refractive index transparent microspheres 4 are affixed via a transparent bonding layer 6 to a transparent substrate 8. The prismatic decorative effect is observed by a viewer on viewing side 10.

Figure 1C:
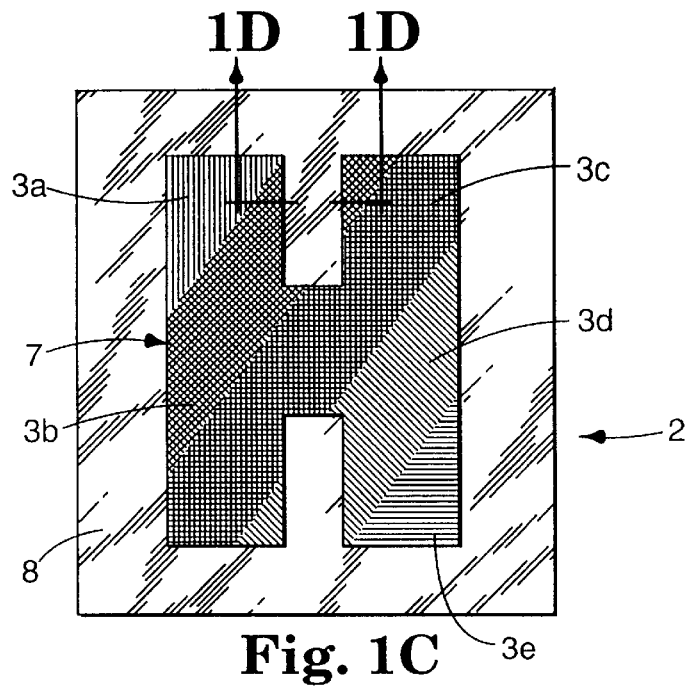
FIG. 1C is a front view of the decorative article of FIG. 1A illustrating its prismatic appearance.

FIG. 1C is a front view of an embodiment of the decorative article 2 of the invention which is prismatically active, meaning a viewer is properly positioned relative to an illumination source. In this case, either the viewer or the light source is fairly close to the embodiment or the article is large enough so that almost the entire spectrum is observed. The colors red 3a, orange 3b, yellow 3c, green 3d, and blue 3e are observed.

Figure 1D:
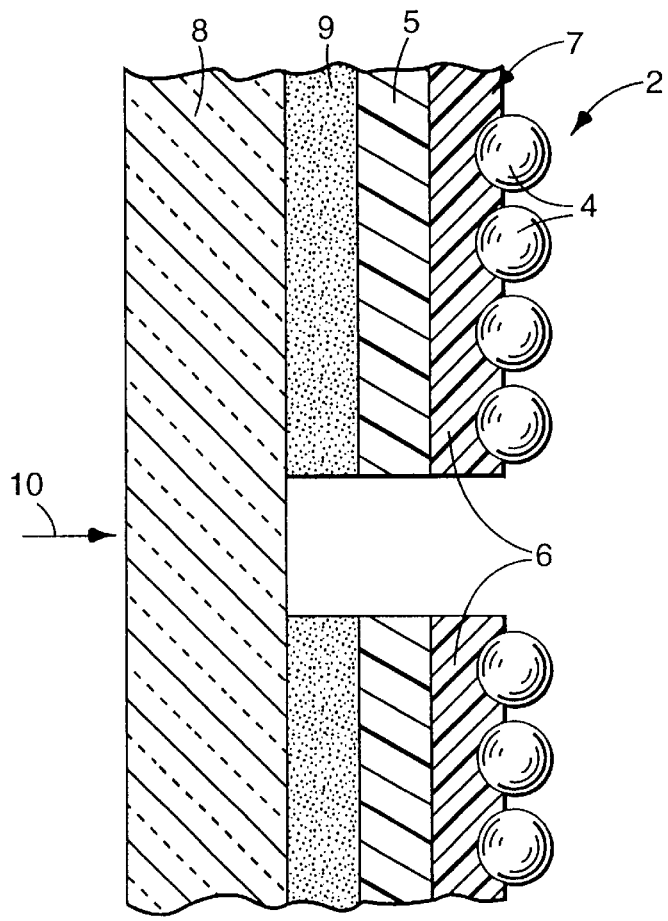
FIG. 1D is a cross-section of a decorative article similar to that of FIG. 1B, except that it contains two additional layers. The decorative article can be made from the graphic media of FIG. 5.

FIG. 1D is an enlargement of a cross-section of the decorative article of 1C. The imaged monolayer of high refractive index transparent microspheres 4 are affixed via a transparent bonding layer 6, a transparent reinforcing layer 5, and a transparent adhesive 9 to a transparent substrate 8. The decorative effect is observed by a viewer on viewing side 10.

Figure 2:
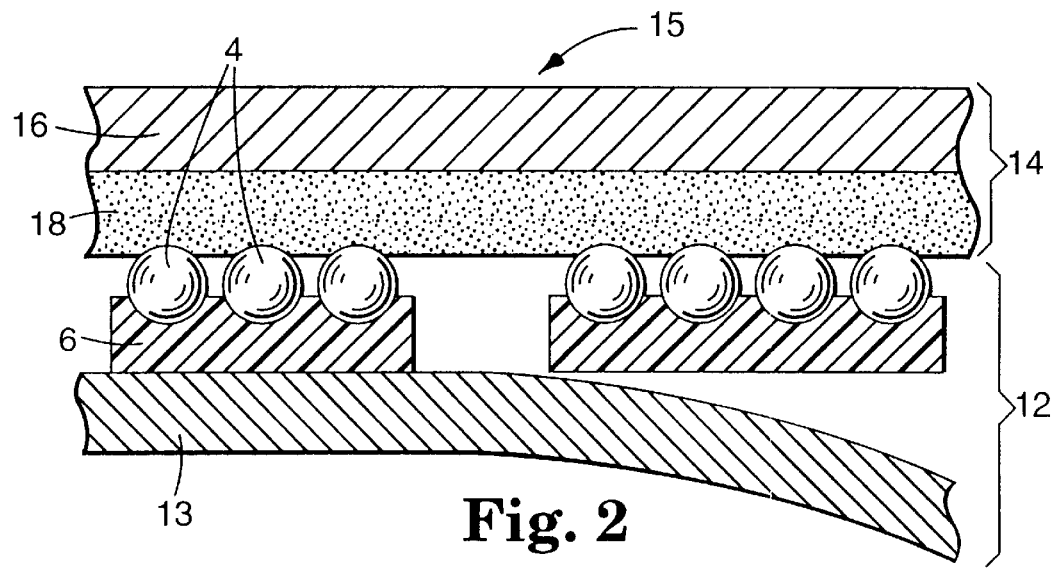
FIG. 2 is a cross-section of a transfer graphic which can be used to make the decorative article of FIG. 1A.

FIG. 2 is a cross-section of a transfer graphic 15 of the invention which can be used to make the decorative article 2 of FIG. 1A. The transfer graphic 15 can be formed from transfer carrier 14 and imaged transfer media 12. The imaged transfer media 12 includes a monolayer of transparent microspheres 4 bonded via a transparent bonding layer 6 to a release liner 13. The transfer carrier 14 includes a transfer carrier backing 16 and an optional layer of transfer carrier adhesive 18 coated thereon. Examples of useful transfer carrier backings include saturated paper coated with styrene-butadiene rubber tackified with hydrogenated rosin esters or biaxially oriented polyethylene terephthalate film. In using the transfer graphic 15, the transparent bonding layer 6 should have a greater adhesion to the ultimate substrate than the adhesion of the optional transfer carrier adhesive 18 or the transfer carrier backing 16 to the microspheres 4 and bonding layer 6. The release liner 13 can be peeled away from the transfer graphic 15. The exposed transparent bonding layer 6 can then be applied to a transparent substrate such as a glass surface. The transfer carrier portion 14 of the transfer graphic can be peeled away leaving the microspheres 4 bonded to the glass substrate via transparent bonding layer 6.

Figure 3:
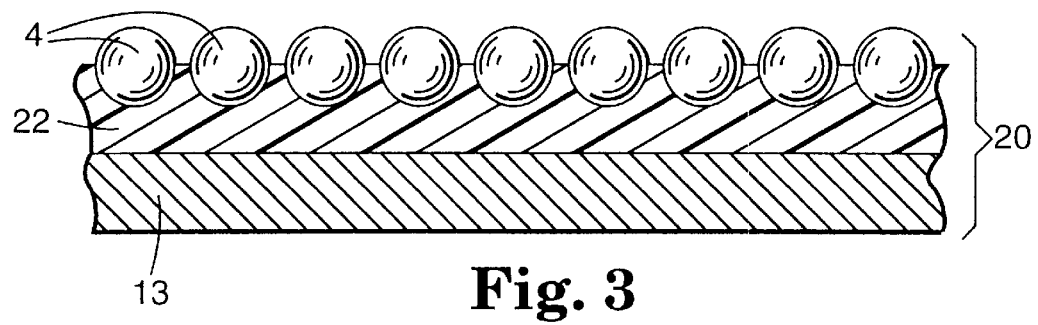
FIG. 3 is a cross-section of a graphic media which can be imaged and used to form the transfer graphic of FIG. 2.

FIG. 3 is a cross-section of an embodiment of a cuttable decorative graphic media 20 of the invention which can be imaged to form a transfer media such as that identified as 12 in FIG. 2 which is part of the transfer graphic 15 of FIG. 2. The cuttable decorative transfer media 20 includes a layer of transparent microspheres 4 bonded via a transparent adhesive/microsphere bonding layer 22 which also functions as an adhesive. The microsphere bonding layer 22 should be of sufficient adhesive strength to secure the microspheres 4 to the ultimate transparent substrate to which they are to be adhered. Release liner 13 protects the bonding layer 22. The microsphere bonding layer should have sufficient film strength to meet the handling requirements of die cutting and weeding required for imaging the transfer graphic when there are no optional layers which provide additional strength.

Figure 4:
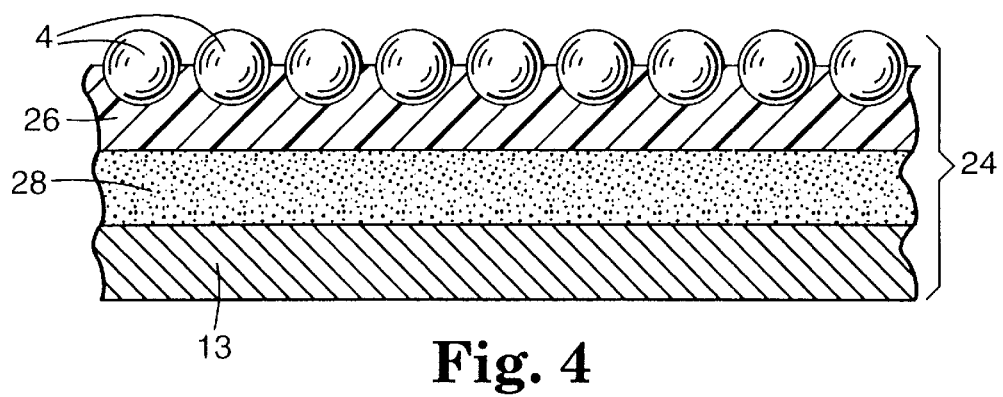
FIG. 4 is a cross-section of a graphic media similar to FIG. 3 but further comprising a transparent adhesive layer, which media can also be imaged and used to form a transfer graphic.

FIG. 4 is a cross-section of an embodiment of a cuttable decorative graphic media 24 similar to that of FIG. 3 but further comprising a transparent adhesive layer 28. Transfer media 24 can also be imaged and used to form a transfer graphic by bonding to a transfer carrier such as that identified as 14 in FIG. 2. The cuttable decorative graphic media 24 comprises a layer of transparent microspheres 4 partially embedded in a transparent microsphere bonding layer 26 which does not need to have sufficient adhesion to secure the microspheres to the ultimate transparent substrate by virtue of having a separate transparent adhesive layer 28 bonded to the side of the transparent microsphere bonding layer 26 opposite the microspheres 4, and a release liner layer 13, attached to the side of the transparent adhesive layer 28 opposite the side bonded to the transparent microsphere bonding layer 26. In imaging, the media would have sections removed down to, but not through, the release liner layer 13.

Figure 5:
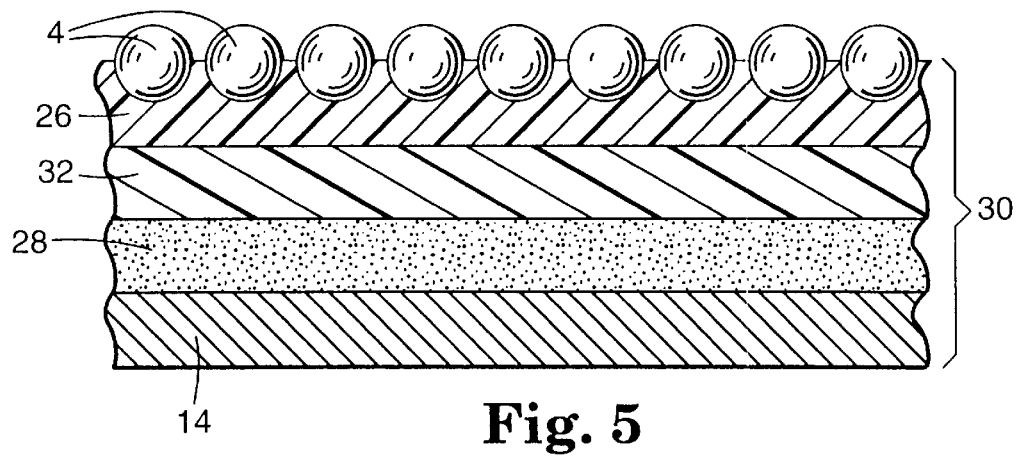
FIG. 5 is a cross-section of a graphic media similar to FIG. 2 but further comprising two additional layers (a transparent adhesive layer and a transparent reinforcing film layer), which media can also be imaged and used to form a transfer graphic.

FIG. 5 is a cross-section of a cuttable decorative graphic media 30 of similar construction as FIG. 4 but further comprising a reinforcing film layer 32 bonded between the microsphere bonding layer 26 and the adhesive layer 28.

FIG. 6 is a light ray diagram which illustrates how the off angle prismatic display results from a section 52 of a decorative article of the present invention. The decorative article section 52 is viewed from viewing side 54. Incoming white light rays 56 and 58 pass through transparent substrate 8, transparent bonding layer 60, whereupon they contact transparent microsphere 4, resulting in the dispersion of the white light rays 56 and 58 into colored light rays 56(a–b) and 58(a–b), respectively. When the colored light rays 56(a–b) and 58(a–b) reach the perimeter of the transparent microsphere 4, where air 62 contacts the microsphere 4, the colored light rays 56(a–b) and 58 (a–b) are reflected back through transparent microsphere 4, through transparent bonding layer 60, and through transparent substrate 8 whereupon they can be observed by a viewer situated at viewing side 54.

FIG. 7 illustrates a light ray diagram of a section 64 of a comparative decorative article, wherein the transparent microsphere 4 is not embedded to a depth of at least 20% the length of its diameter in transparent bonding layer 60. The viewer side of article 64 is indicated as 54. A direct incoming white light ray 68 passes through the transparent substrate 8, through the transparent bonding layer 60, into transparent microsphere 4, where it is dispersed into colored light rays 68(a–b). The colored light rays 68(a–b) are transmitted through the transparent microsphere 4 until they reach the perimeter of the transparent microsphere 4 where it is in contact with air 62. The colored light rays 68(a–b) are reflected back through the microsphere 4 where they contact another perimeter of the microsphere which is in contact with air, 62, which results in further reflection of the colored light rays 68(a–b) within the microsphere 4, rather than back to the viewer situated at viewing side 54.

Figure 8:
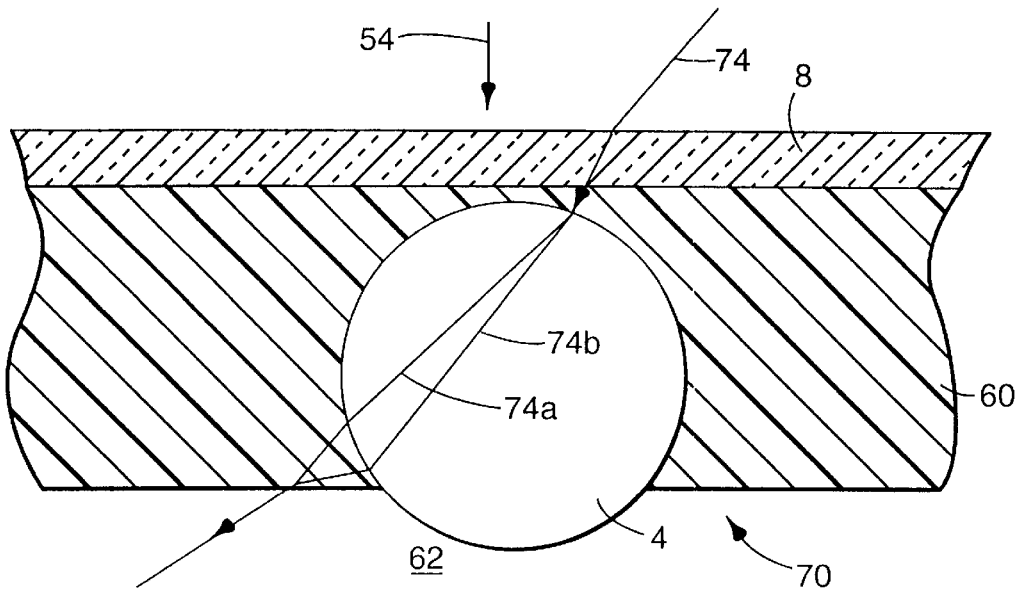
FIG. 8 is a light ray diagram which illustrates why the transparent microspheres should not be embedded to a depth greater than about 80% of their diameters in the transparent bonding layer.

FIG. 8 is a light ray diagram of a section 70 of a comparative decorative article wherein a transparent microsphere 4 is embedded in the transparent bonding layer 60 at a depth of greater than about 80% of the length of its diameter. The viewer side of the article section 70 is indicated as 54. An oblique incoming white light ray 74 passes through the transparent substrate 8, through transparent bonding layer 60, whereupon it enters transparent microsphere 4, where it is dispersed into colored light rays 74(a–b) which pass through the transparent microsphere 4 where they contact a portion of the perimeter of the microsphere 4 in contact with the bonding layer 60 rather than a perimeter of the microsphere 4 in contact with air 62, thus resulting in the passage of the colored light rays 74(a–b) through the bonding layer 60 into air 62 which is on a side of section 70 opposite viewer side 54.

Figure 9:
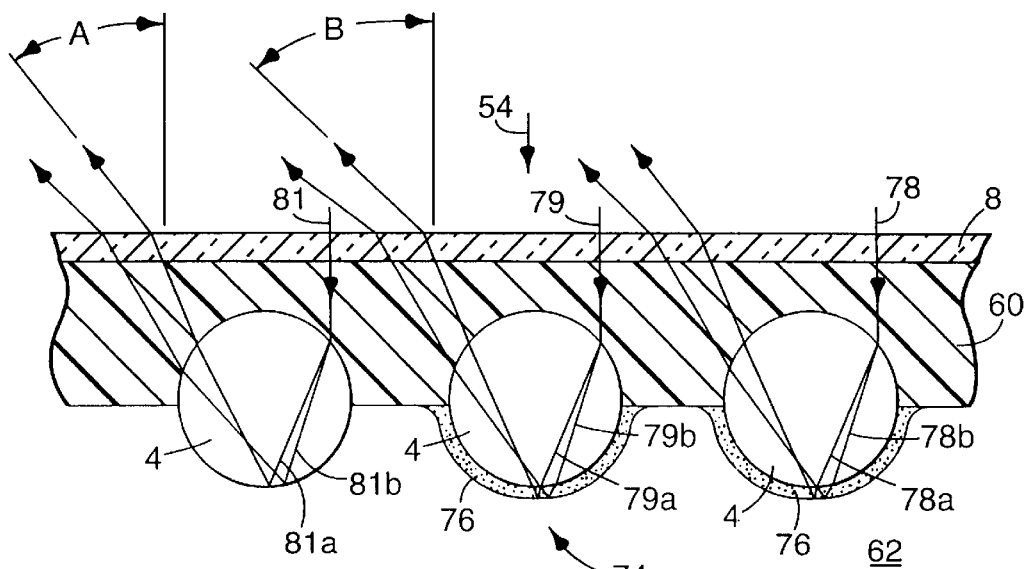
FIG. 9 is a light ray diagram which illustrates how the prismatic viewing angle is altered when a thin layer of a transparent coating is printed on the surface of the transparent microspheres not embedded in the transparent microsphere bonding layer of the decorative article of the invention.

FIG. 9 illustrates a light ray diagram which demonstrates how the prismatic viewing angle of a section 74 of the decorative article of the invention is altered when a thin transparent layer of ink 76 is printed on the backside surface of the transparent bonding layer. The backside surface of the bonding layer is the surface having the exposed transparent microspheres partially embedded therein. The ink is coated on a number of the transparent microspheres 4, typically in the form of an image. The viewing side is indicated by 54. Incoming white light rays 78, 79, and 81 pass through the transparent substrate 8, the transparent bonding layer 60, and subsequently enter transparent microspheres 4, where they are dispersed into colored light rays 78(a–b), 79(a–b), and 81(a–b), respectively. The colored light rays 78(a–b) and 79(a–b) pass through the transparent microspheres 4 where they enter into layers of ink 76 printed on the sides of the microspheres 4 opposite the side embedded in the transparent bonding layer 60. Each layer of ink 76 has a thickness less than the focal length of the microsphere|coating system. The angle of the colored light rays 78(a–b) and 79(a–b) change slightly as they enter the ink layers 76. When the colored light rays 78 (a–b) and 79(a–b) reach the interface of the ink layer 76 and air 62 they are reflected back through the ink layer 76 and transparent microsphere 4, where again the angle of the colored light rays 78(a–b) change slightly. From there the colored light rays 78 (a–b) and 79 (a–b) continue to pass through the transparent microspheres 4, through the transparent bonding layer 60 (where the colored light rays 78(a–b) and 79(a–b) angles slightly change again), and into air where they can be observed by a viewer on viewing side 54. The colored light rays 81(a–b) pass through microsphere 4 and contact the non-ink coated microsphere 4 perimeter in contact with air 62 and are reflected back to a viewer at a different angle than colored light rays 79(a–b) and 78(a–b) thus creating a visual color difference.

Figure 10:
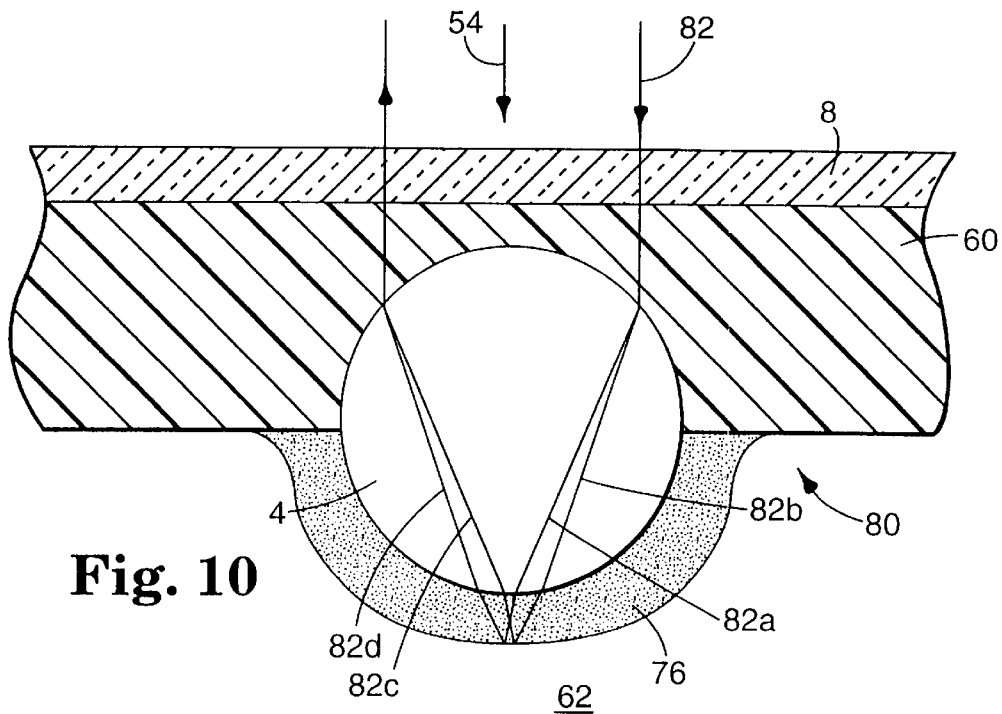
FIG. 10 is a light ray diagram which illustrates how a retroreflected image results when a transparent coating is printed on the surface of the microspheres not embedded in the transparent microsphere bonding layer said transparent coating thickness and refractive index combining to result in the focal point of the lens system, for the decorative article of the invention.

FIG. 10 illustrates a light ray diagram of a section 80 of a decorative article of the invention which demonstrates how a retroreflected image results when the back surface printed transparent ink 76 thickness and refractive index combine to achieve the focal point of the lens system. Incoming white light ray 82 passes through transparent substrate 8, transparent bonding layer 60, and enters transparent microsphere 4 where it is dispersed into colored light rays 82(a–b). The colored light rays 82(a–b) pass into and through the ink layer 76 to the interface between the ink layer 76 and air 62, whereupon they are reflected back through the ink layer 76, through the transparent microsphere 4, transparent bonding layer 60, and transparent substrate 8, where they can be observed by a viewer on viewing side 54. Thus, when retroreflection occurs, an image much brighter than the etched appearance of the unprinted adjacent areas can be observed at angles less than that of the prismatic display, near the source of incoming light.

Figure 11:
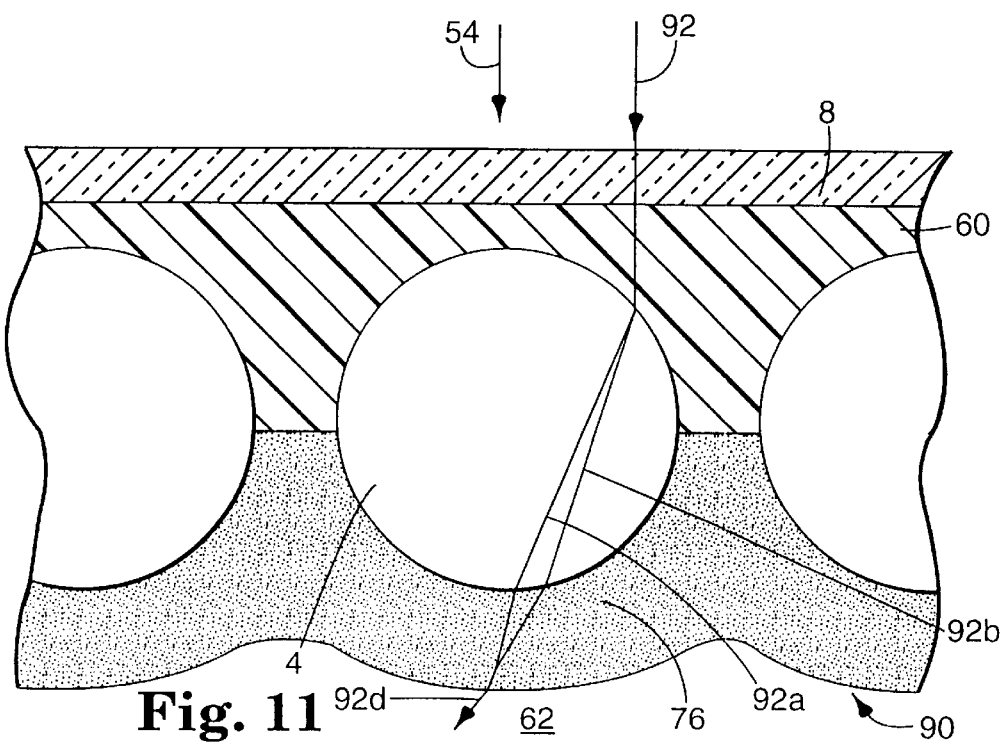
FIG. 11 is a light ray diagram which illustrates why a transparent image is observed by the viewer when the backprinted transparent ink thickness and refractive index combine to exceed the focal point of the lens system, for the decorative article of the invention.

FIG. 11 illustrates a light ray diagram of a section 90 of a decorative article of the invention which demonstrates how a transparent image results when the back surface printed transparent ink 76 thickness negates the spherical shape of the surface and allows the light to pass through. A viewer situated at viewing side 54 observes incoming white light ray 92. The white light ray 92 passes through transparent substrate 8 and transparent bonding layer 60, where it enters transparent microsphere 4, where it is dispersed into colored light rays 92(a–b). The colored light rays 92(a–b) are transmitted therethrough to the side of the transparent microsphere 4 not embedded in the transparent bonding layer 60 which has been coated with a thick layer of ink 76. The thickness of the ink layer 76 is such that the light rays 92 (a–b) converge to form light ray 92d which passes through the ink layer 76 rather than back through the microsphere 4 towards the viewer. This is due to the fact that the thickness of the ink layer 76 exceeds the focal point of the microsphere/coating system.

Figure 12:
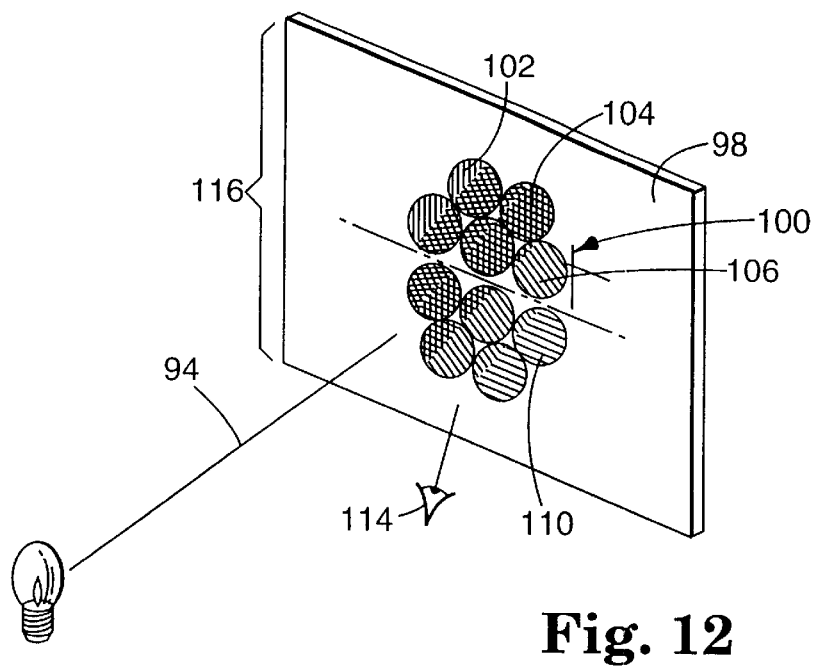
FIG. 12 is a perspective view which illustrates the difference in color observed on adjacent sections of the decorative article of the invention due to the presence of adjacent sections of microspheres with differing refractive indices.

FIG. 12 illustrates the colored pattern 100 observed by a viewer 114 as white light rays 94 falls upon decorative article 116, comprising a transparent substrate 98 having a decorative pattern thereon defined by a layer of transparent microspheres. The colors red 102, orange 104, yellow 106, green 108, and blue 110 are observed by the viewer 114. To approximate this illustrated view, the light source must be further away from the decorative article than the viewer and the viewer must be fairly close or the display surface large.

Figure 13:
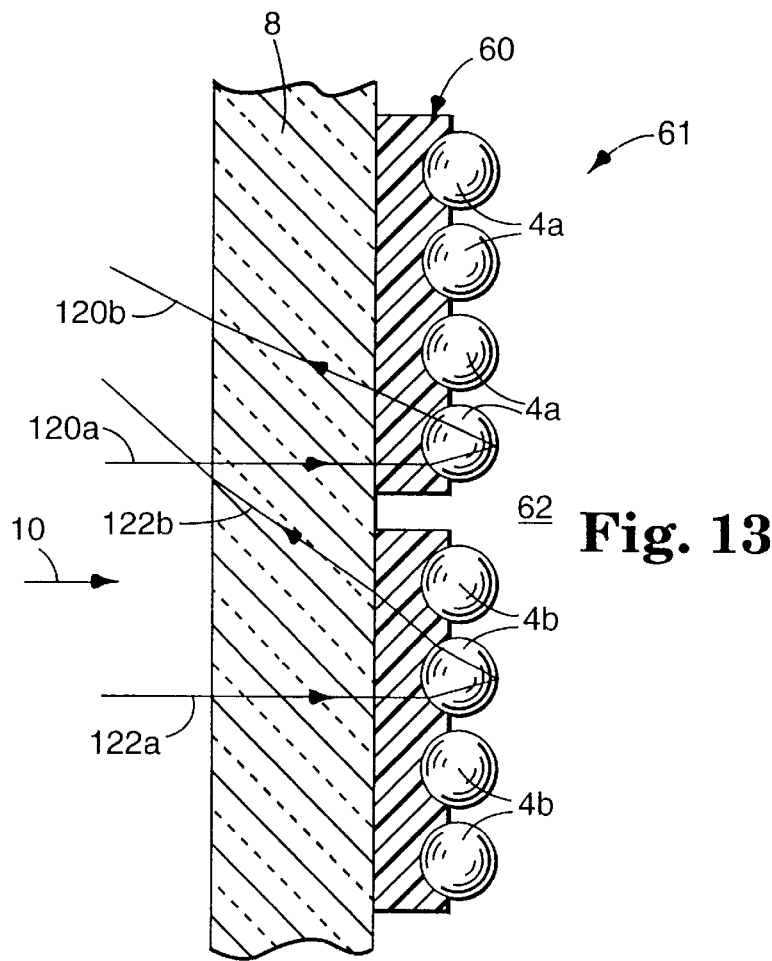
FIG. 13 is a cross-section diagram which illustrates how incident light rays are refracted to different angles when the microspheres have differing refractive indices.

FIG. 13 illustrates a section 61 of a decorative article having microspheres of differing refractive indices. Incoming white light rays 120a and 122a enter transparent substrate 8, transparent bonding layer 60, and enter microspheres 4a and 4b, respectively. The microspheres 4a and 4b possess different refractive indices. The white light rays 120a and 122a are dispersed into colored light rays 120b and 122b respectively upon contact of the white light rays 120b and 122b with the perimeter of the microspheres 4a and 4b in contact with air 62. The colored light rays 120b and 122b are then reflected back through the microspheres 4a and 4b, the transparent bonding layer 60, and transparent substrate 8 to a viewer on viewing side 10 who observes a visual color difference due to the difference in refractive indices of the microspheres 4a and 4b.

Figure 14:
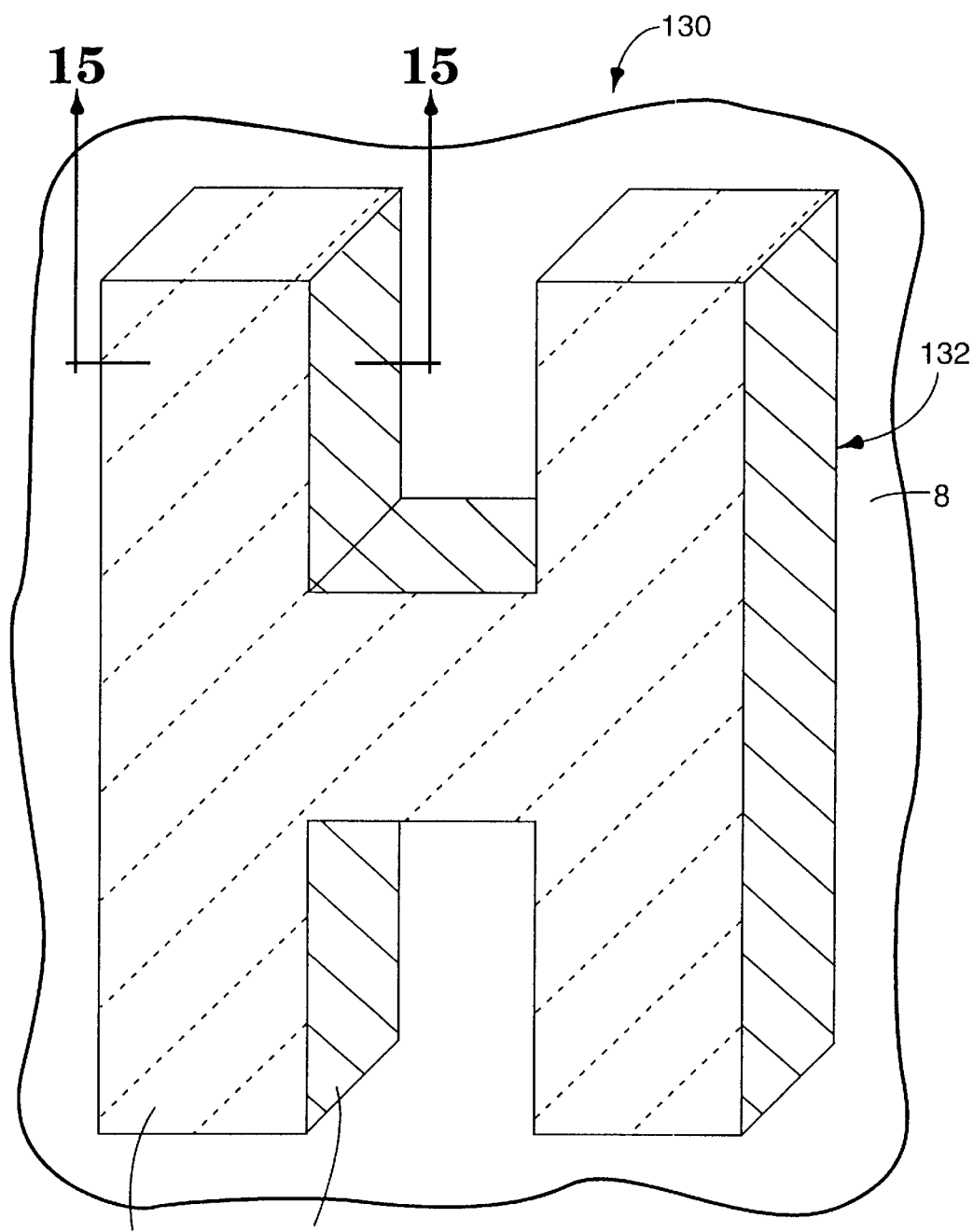
FIG. 14 is a decorative article containing a drop shadow 3-dimensional appearing image formed by varying the thickness of the transparent coating on the surface of the microspheres not embedded in the transparent microsphere bonding layer.

FIG. 14 is a decorative article 130 of the invention having a three-dimensional appearance. A continuous layer of microspheres is bonded via a transparent bonding layer to transparent substrate 8. A portion of the exposed microspheres have a coating in the form of the letter "H" 132. However, the coating is of a single thickness in the sections identified as 134 whereas the coating is of double thickness in the sections identified as 136, thus providing a three-dimensional appearance.

Figure 15:
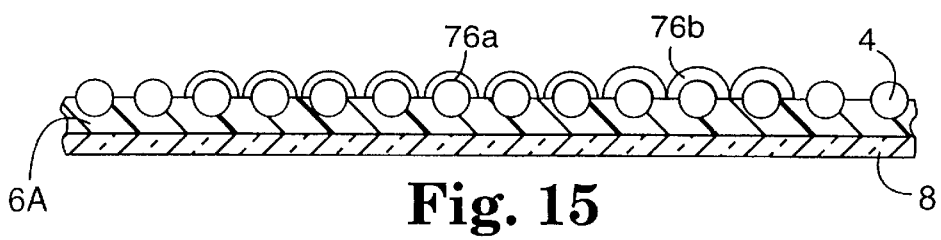
FIG. 15 is an enlarged cross-section of the decorative article of FIG. 14.

FIG. 15 is a cross-section of the decorative article of FIG. 14. A layer of microspheres 4 is bonded to the transparent substrate 8 via transparent bonding layer 6A. Some of the microspheres 4 are uncoated whereas some are coated with a single thickness of ink 76a and some are coated with a double thickness of ink 76b to provide a three-dimensional image.

FIG. 16 is an illustration of the viewing condition, for the prismatic display as previously described.

EXAMPLES

The following Examples further illustrate but do not limit the present invention. All parts, percentages, ratios, etc. in the Examples and the rest of the specification are by weight unless indicated otherwise.

Example 1

This example describes the preparation of a decorative article similar to but not identical to that shown in FIG. 1B. A 23% solids microsphere binder solution for screen printing onto window glass was made from the following ingredients:

Resin Solids
26.65% Union Carbide VYNS3, a vinyl chloride/vinyl acetate copolymer resin
9.87% Union Carbide VAGH, a partially hydrolyzed vinyl chloride/vinyl acetate copolymer resin
53.30% Rohm & Haas Acryloid™ B44, an acrylic copolymer resin
3.60% C. P. Hall Paraplex™ G-62, an epoxidized soybean oil plasticizer
4.30% BASF Uvinol™ N-539, a substituted acrylonitrile ultraviolet light absorber
1.78% Witco Nuostab™ V-1923, a calcium-zinc salt heat stabilizer
0.25% Union Carbide A1130, a triaminofunctional silane adhesion promoter
0.07% General Electric SF96, a polymethyl siloxane flow control agent Solvent Blend
40.2% Cyclohexanone
26.8% Diethylene glycol monoethyl ether acetate
17.5% N-methyl-2, pyrrolidone
15.5% Mixed aromatic hydrocarbons, 65° C. flashpoint A dried film from this solution had a refractive index as measured by an Abbe refractometer of about 1.518. This solution was used to screen print an image onto a single strength pane of soda-lime window glass via a 110 mesh polyester filament screen using a double pass print. The printed glass was partially dried at 65° Celsius for 4.5 minutes in a convection oven such that the surface was still slightly tacky from retained solvent; the warm imaged plate was then immediately coated with essentially a monolayer of glass beads by cascading a bank of glass beads over the surface. Said glass microspheres (beads) were made according to U.S. Pat. No. 3, 493,403 and had a refractive index of about 2.26 via Becke method and a mean diameter of about 48 micrometers with a plus or minus 9 micrometer distribution. The glass beads had also been surface treated with an organo-chromium complex for bead adhesion and a fluorocarbon flow control agent. The excess microspheres were removed with a compressed airjet and the resulting bead coated pane was then dried at 120° C. for 7 minutes to remove the remaining solvents. The microspheres in the resulting bead coated image were embedded about 20% to about 35% of the mean bead diameter in the bead binder as viewed in cross section under a microscope, i.e., about 65%–80% of the mean bead diameter was exposed to ambient air. The resulting image had the appearance and feel of a sand blasted etched glass surface. The imaged glass pane was placed in a room having low illumination and further illuminated with a focused flashlight placed perpendicular to the surface at a distance of about 2 meters, with the plate oriented such that the glass beads were on the opposite side of the glass pane (the light passes through the pane first). The observer viewed the plate from the same distance, with the flashlight arbitrarily defined as 0 degrees observation angle. A decorative rainbow-like prismatic display was observed within the bead coated image starting with a light violet-blue color at about 25 degrees radial observation angle relative to the light source, and changing through the color spectrum to a red color as the observer moved off angle from the light source to about 40 degrees radial observation angle. The yellow-orange color, was observed at about 37 degrees. There was no observed color at observation angles less than about 24 radial degrees or greater than 41 radial degrees relative to the light source, rather, the image had the diffuse appearance of an etched glass surface.

Comparative Example 2

This example illustrates the importance of minimum bead embedment. Another decorative article was prepared as in Example 1 except the drying condition after screen printing the bead binder, but prior to coating with the glass beads was lengthened to 7.0 minutes at 65° Celsius. The resulting beads in the bead coated image were embedded about 10%–15% of the mean bead diameter in the bead binder as viewed in cross-section under a microscope, i.e., about 85%–90% of the mean diameter was exposed to ambient air. When illuminated as in Example 1 the prismatic display was not evident at the 24–41 degree radial observation angle, nor at any other observation angle. At about 0–5 degree observation angle a portion of the incident light was observed as a highlight, assumed to be multiple internal reflections from each microsphere.

Example 2

A decorative article was prepared as in Example 1 except with a drying condition after screen printing the bead binder, but prior to bead coating, of only 3.5 minutes at 65° Celsius, the resulting embedment depth was about 30%–45%, i.e., about 55%–70% of the mean bead diameter was exposed to ambient air. When this sample was illuminated in the darkroom as in Example 1, the prismatic display appeared at the same 24–41 degree radial observation angles as in Example 1.

Example 3

This example illustrates that the microsphere diameter does not affect the observation angle of the prismatic display.

Two decorative articles were prepared by printing and bead coating as in Example 1 except that bead distributions of 2.26 refractive index beads which were smaller than and larger than Example 1 were used. For the smaller bead size the mean diameter was about 25 micrometers plus or minus a 10 micrometer distribution. This sample was oven dried for 5.5 minutes at 65° Celsius after printing, and then bead coated and dried as in Example 1. The beads in the resulting bead coated image were embedded to about 40%–70% of the mean diameter, i.e. about 30%–60% of the mean diameter was exposed to ambient air. For the larger bead size the mean diameter was about 70 micrometers plus or minus a 10 micrometer distribution. This sample was oven dried for 2.5 minutes at 65° Celsius. This sample also had the appearance of etched glass. When illuminated under the same conditions of Example 1 the prismatic displays for these two different decorative articles having different microsphere size ranges had the same radial observation angles as in Example 1.

Example 4

This example illustrates the effect of using a microsphere with a different refractive index:

A decorative article was prepared using the bead binder of Example 1 except a glass microsphere commercially available from Flexolite Company and having a refractive index of about 2.10 and with a mean diameter of about 42 micrometers with a plus or minus 8 micrometer distribution was used. This sample was oven dried for 5.0 minutes at 65° Celsius and bead coated and dried as in Example 1. The beads in the resulting bead coated image were embedded about 30% to 45% in the binder resin. This sample also had the appearance of etched glass. When illuminated under the same conditions as in Example 1 a prismatic display was observed at a different range of radial observation angle. A light violet-blue color was observed at about 35 degrees radial observation angle relative to the light source progressing through the spectrum to a red color at about 51 degrees observation angle. A yellow-orange color was observed at about 47 degrees radial observation angle. There was no other observed prismatic display at observation angles less than about 34, nor more than about 52 degrees, just the diffuse appearance of etched glass.

Example 5

This example illustrates the effect of using bead bond layer having a different refractive index in a decorative article. A 46% solids bead binder solution for screen printing onto glass was made of the following ingredients:
Resin Solids
88.87% Dutch State Mines Uralac™ CP1049 SU, a urethane extended polyester resin
9.10% Monsanto Resimene™ 881, a partially butylated melamine formaldehyde resin
2.00% Tinuvin™ 328, a Benzotriazole type ultraviolet (UV) light absorber available from Ciba-Geigy
0.03% General Electric SF-96, a polymethyl siloxane flow control agent
Solvent Blend
77.9% Mixed aromatic hydrocarbons, 65° C. flashpoint
14.2% Diethylene glycol monoethyl ether acetate
5.3% Xylene
2.6% Butanol
A dried and cured film from this solution had a refractive index of about 1.533. An image was screen printed from this solution, portions of which were adjacent to the first bead coated image on the decorative article of Example 1, using a 110 mesh polyester screen. The second bead bond image was dried for 10 minutes at 65° Celsius, and then placed in a 110° C. oven for 1 minute so that the new bead bond became tacky. It was then coated with the glass beads used in Example 1, using the same cascading technique. Finally, the imaged glass plate was placed in a 150° C. oven for 3 minutes to complete the bead embedment and cure of the thermosetting resin system. The beads in the resulting second bead coated image were embedded to about 40–50% of the mean diameter. The second image had a very similar etched glass appearance like the first image, however, when illuminated in the darkroom as in Example 1, the prismatic display was observed to begin with a light violet-blue color at about 27 degrees radial observation angle proceeding through the rainbow colors to a red color at about 43 degrees radial observation angle. Furthermore, the second image was in color contrast to the first image where they were adjacent, i.e., the violet-blue color of the second image was adjacent to a blue-green color of the first image at about 32 degrees radial observation angle, and the yellow-green color of the second image was adjacent to a yellow color of the first image at about 37 degrees observation angle. The continually changing color contrast as the viewing angle was changed relative to the light source resulted in a decorative effect.

Example 6

This example illustrates the effect of having two different refractive index beads in different portions of the same image in decorative articles of the invention to yield a color contrast as a function of viewing angle.

The solution of Example 5 was screen printed onto a glass plate with a 157 mesh polyester screen, dried for 10 minutes at 65° Celsius, followed by heating for 1 minute at 110° C., followed by beadcoating with the 2.10 refractive index Flexolite glass bead of Example 4. Prior to completing the bead embedment and cure, a different image was screen printed using the same solution onto the glass plate in registry with the first image such that areas were adjacent to the first image to complete a design theme wherein each image was intended to complement the other. The second bead bond image was dried at 65° C. for 10 minutes, followed by heating to 110° C. for 1 minute, followed by bead coating with a cascade of glass bead made according to the teachings of U.S. Pat. No. 3,493,403. Said beads had a refractive index of 2.19 and an average mean diameter of 48 micrometers with a 9 micrometer distribution. The second beadcoat only adhered to the second bead bond image, since the first image was already covered by the beads having 2.10 refractive index. Finally, the beadcoated plate was heated to 150° C. to complete the bead embedment and cure of the thermosetting resin system for both images. The resulting imaged plate had the appearance of etched glass. The first beadcoated image was slightly whiter than the second beadcoated image owing to the differing size and color of the beads coated thereon, and the slight visual contrast provided a decorative effect. Under darkroom illumination conditions as described in Example 1, the first image had a prismatic display visible from about 38 degrees radial observation angle to about 51 degrees radial observation angle while the second image had a prismatic display from about 33 degrees radial observation angle to about 48 degrees radial observation angle. A decorative color changing contrast existed between the two images over a wide viewing range.

Example 7

This example describes a graphic medium similar to that in FIG. 3 and the transfer graphic made from it, similar to but not identical to that shown in FIG. 2, followed by application to a substrate to form a decorative article of the invention similar to but not identical to that shown in FIG. 1B.

A 40 micrometer thick film of Surlyn™ 1705 Ionomer, a thermoplastic copolymer of ethylene and methacrylic acid containing a zinc ionic crosslinking agent, available from DuPont, and having a measured refractive index of about 1.505 was cast via thermoplastic extrusion onto a 90 micron thick, biaxially oriented and heat stabilized film of polyethylene terephthalate (PET). A length of this web was placed in a 150° C. oven and cascade bead coated with a 2.26 refractive index glass microsphere having a mean diameter of about 60 micrometers, with a plus or minus 10 micrometer distribution. The web was then placed in a 195° C. oven for 45 seconds to embed the microspheres to about 45–55% of the mean diameter. The resulting graphic medium was placed on a computer driven X-Y knife cutter and an image was cut through the microsphere bonding layer without cutting through the PET release film, followed by removal (weeding) of the background image from the foreground by peeling from the PET release liner. Since the image would be ultimately viewed on the second surface, the image cut was the reverse of the desired viewing image. A pressure-sensitive transfer carrier commercially available from 3M Company as SCPM-2 Prespacing Tape, was laminated to the imaged medium via a hard rubber roller to form the transfer graphic. The PET release liner was then removed from the imaged transfer carrier, laminated to a glass window pane, placed in an oven set at 150° C. and immediately placed under a vacuum of about 100 torr to remove the air bubbles between the substrate and the thermoplastic microsphere bonding layer, which also functions as the substrate bonding adhesive. Heating continued for 10 minutes, whereupon the panel was removed from the oven, cooled to room temperature, followed by removal of the transfer carrier to form a decorative article of the invention. The image had the appearance of etched glass and exhibited a prismatic display at about 23–39 degrees observation angle.

Example 8

This example illustrates a graphic medium similar to that shown in FIG. 4. It also illustrates that the observation angle of the prismatic display is not dependent on the transparent substrate on which the graphic is placed. A transfer graphic suitable for creating a decorative article of the invention was made as follows:

A free radical solution polymerized acrylic terpolymer pressure-sensitive adhesive comprising by weight 70% isooctyl acrylate, 22.5% methyl acrylate and 7.5% acrylic acid, and having an intrinsic viscosity of about 0.6, and at 42% solids in ethyl acetate solution, to which had been added by weight, 1.5% azo-bis-isobutyronitrile, was knife coated onto a silicone release liner and dried in a convection oven to result in about a 25 micrometer thickness. The resulting adhesive coated liner was overcoated with a knife coater using a thermoplastic water-based bead bonding layer comprising the following:

81.95% Zeneca Neorez™ R-9621, urethane polymer dispersion
11.53% Zeneca Neorez™ R-9699, urethane acrylic polymer dispersion
1.64% Rohm and Haas QR708 acrylic thickener (25% solids in isopropanol
0.10% BYK Chemie BYK-025 defoamer
0.12% Triton™ GR-7M surfactant available from Rohm and Haas
4.66% stabilizer solution having 1 part Ciba-Geigy Tinuvin 123, a hindered amine, and 2 parts Ciba-Geigy Tinuvin 1130, a benzotriazole type ultraviolet light absorber, in diethylene glycol monobutyl ether @ 25% overall solids.
A coating orifice of about 150 micrometers resulted in a dried thickness of about 48 micrometers. The refractive index of a dried film of this coating was found to be about 1.511. The bead bonding layer was dried for 5 minutes at 65° C. and 3 minutes at 110° C., and then cascade beadcoated at 110° C., with a 2.26 refractive index glass bead, having a 60 micrometer mean diameter with a plus or minus 10 micrometer distribution, followed by heating at 150° C. for 2 minutes to embed the beads in the thermoplastic bonding layer to about 45–60% of the mean diameters. The resulting web was placed in a computer driven X-Y knife cutter and an image was defined by knife-cutting through the beadcoat and adhesive layers without cutting through the silicone release liner. Since the image would be ultimately viewed on a second surface, the image was the reverse of the desired image. The background image was removed (weeded) from the liner leaving the desired transfer image on the liner. The intermediate pressure-sensitive adhesive transfer carrier of Example 7 was laminated to the remaining image to enable removal of the release liner from the beaded image without disrupting the spacing of the image elements, and to carry the image to the substrate, as is well known in the art of transfer graphics. The image was transferred to a glass window plate by prewetting both the glass and the pressure-sensitive adhesive surface with 25% isopropanol in water, applying wiping pressure with a plastic squeegee to cause the pressure-sensitive adhesive to intimately contact the glass and exclude the wetting solution from the interface, followed by removal of the intermediate carrier. The resulting beadcoated image on the glass had the appearance and tactile feel of etched glass. When illuminated as in Example 1 a prismatic display was observed between about 24 degrees to about 40 degrees radial observation angle. When identical transfer graphics were applied to commercial polyacrylic and polycarbonate transparent glazing sheets, the prismatic display angles appeared to be the same regardless of substrate.

Example 9

This example illustrates another embodiment of a transfer graphic similar to that shown in FIG. 4 which is then used to make a decorative article. It also illustrates how the observation angle range of the prismatic display is not affected by placing another transparent layer in between the substrate and the microsphere bonding layer.

The microsphere coated Surlyn™ 1705 film on PET release film from Example 7 was removed from the PET, discharge corona treated, such that water would wet out its surface, and laminated to an acrylic pressure-sensitive laminating adhesive commercially available from 3M Company, identified as Scotch™ 9667 MP, to form a graphic medium. After subsequent imaging and transfer to glass, Plexiglas™ and Lexan™ substrates, using the transfer carrier of Example 7, the resulting images appeared like etched glass and exhibited prismatic displays at the same 23–39 degree observation angle range as Example 7.

Example 10

This example illustrates the use of a mixture of glass microspheres with differing refractive index with the same bead bonding layer to create a different appearance in decorative articles of the invention.

The pressure-sensitive adhesive and bead bonding dispersion of Example 8 were used to make a transfer graphic according to the procedure of Example 8 with the exception that the 2.26 refractive index beads were first mixed with an equal weight of 2.19 refractive index beads of the same size distribution to form a 50/50 mixture, and this new mixture was cascade coated as before. The resulting graphic film was imaged via computer driven knife cutter, followed by weeding, laminated to an intermediate pressure-sensitive adhesive transfer carrier and wet applied to a glass plate as in Example 8. The graphic again had the appearance of etched glass with a uniform surface. The prismatic display started at about 24 degrees observation angle with a violet color, due to the 2.26 refractive index beads becoming prismatically active. However, the brightness of the display was about half as intense as the display of Example 8. At about 31 degrees radial observation angle the 2.19 refractive index beads started to become active and a bright magenta color of about the same intensity as Example 8, was visible at about 36 degrees due to the mixing of the red portion of the spectrum from the 2.26 index beads with the blue portion of the spectrum from the 2.19 beads. At about 40 degrees observation angle the 2.26 index beads became prismatically inactive; however, the 2.19 beads extended the prismatic display to about 51 degrees observation angle.

Example 11

This example illustrates a transfer graphic where different portions of the image have glass beads with different refractive index to create a color contrast.

The pressure-sensitive adhesive and bead bonding dispersion of Example 8 were used to make a transfer graphic according to the procedure of Example 8 with the exceptions that the bead bonding dispersion was coated thicker to yield a dry thickness of about 45 microns and a 2.19 refractive index bead was used having a 70 micrometer mean diameter with a plus or minus 10 micrometer distribution. A transfer graphic image was cut and weeded from this sheet, laminated to the aforesaid pressure-sensitive adhesive transfer carrier, and subsequently laminated in registry to a separately cut and weeded transfer graphic having a complementary image cut and weeded from the sheet from Example 8 to result in a transfer graphic having portions of the design theme having the higher refractive index beads in proximity to the lower refractive index beads on the same transfer carrier. This composite transfer graphic was applied to a glass window using the technique of Example 8 to result in a decorative article having an etched glass appearance. A prismatic display was observed starting at about 24 degrees radial observation angle where the portions of the image having the higher refractive index beads had a violet-blue color, creating a contrast with the etched appearance of the lower refractive index beads which were not yet prismatically active. As the observation angle increased to about 31 degrees, the portions of the image having the higher refractive index beads had changed to a blue-green color while the image portions having the lower refractive index beads were prismatically active with a light violet-blue color. As the observation angle increased to about 41 degrees, the portions of the image containing the higher index beads started returned to their diffuse, etched glass appearance while the adjacent image areas having the lower index glass beads had changed to a green color. At about 51 degrees, the portions of the image containing the lower refractive index beads returned to their diffuse, etched appearance. As with the previous examples the continually changing color contrast provided a dramatic effect.

Example 12

This example illustrates a transfer graphic where different portions of the image have bead bonding layers with different refractive indices to create a color contrast.

The bead bond solution described in Example 5 was knife coated on a release liner to result in a dried thickness of about 38 micrometers. After drying, it was beadcoated using the procedure of Example 5 with 2.26 refractive index glass beads having a mean diameter of about 70 micrometers with a plus or minus 10 micrometer distribution and cured to result in a bead embedment of about 40%–60%. The resulting sheet was removed from the release liner and laminated to the pressure-sensitive adhesive described in Example 8, which has been coated on a silicone release liner and dried to result in about a 25 micrometer thickness. The lamination was made to the side of the bead coat contacting the release liner on which it was coated, i.e., the smooth side. A transfer graphic image was cut from the resulting sheet, weeded, and laminated to the aforesaid PSA transfer carrier of Example 1, and subsequently laminated in registry to a separately cut and weeded transfer graphic having a complementary image cut and weeded from the sheet from Example 8 to result in a transfer graphic having portions of the design theme having the higher refractive index bead bonding layer of Example 5 in proximity to the lower refractive index bead bonding layer of Example 8, only on the same transfer carrier. This composite transfer graphic was applied to a glass window using the technique of Example 7 to result in an etched glass appearance. A prismatic display was observed starting at about 24 degrees radial observation angle where the portions of the image having the lower refractive index bead bonding layer had a light violet-blue color, creating a contrast with the etched appearance of the higher refractive index bead bonding layer which was not yet prismatically active. As the observation angle increased to about 27 degrees, the portions of the image having the lower refractive index bead bonding layer had changed to a blue color while the image portions having the higher refractive index bead bonding layer were now prismatically active with a light violet-blue color. As the observation angle increased to about 40 degrees, the portions of the image containing the lower refractive index bead bonding layer started returning to their diffuse, etched glass appearance while the adjacent image areas having the higher index glass beads had changed to an orange color. Finally, at about 44 degrees observation angle, the portions of the image having the higher refractive index bead bond returned to their diffuse etched glass appearance, This effect could have also been accomplished by transferring the two images to the glass in separate operations and having the registration operation take place on the substrate surface, rather than on the transfer carrier.

Example 13

This example illustrates a transfer graphic made from the graphic medium shown in FIG. 5, having a reinforcing layer in between the adhesive and the bead bonding layer to aid in the weeding operation in the event the bead bonding layer does not have sufficient film strength of its own.

A transfer graphic having a film reinforcing layer and a low refractive index bead bonding layer was made as follows:

The pressure-sensitive adhesive coated liner described in Example 8 was overcoated with a water-based reinforcing layer of the following, using a knife coater with about a 100 micrometer orifice:

91.42% Zeneca Neorez™ R-9699, a urethane polymer dispersion
1.46% Rohm and Haas QR708 acrylic thickener @ 25% solids in isopropanol
0.10% BYK Chemie BYK-025 defoamer 0.12% Triton™ GR-7M surfactant available from Rohm and Haas
6.00% Stabilizer solution described in Example 8
After drying, the following bead bonding solution was overcoated on the reinforcing layer with a knife coater at about 125 micrometers orifice:
Resin Solids
80% Solvay Solef™ 1002X a polyvinylidene fluoride polymer
20% Rohm and Haas Acryloid 10s, an acrylic resin
Solvent Blend
50% N-methyl, 2-pyrrolidone
50% Propylene glycol methyl ether acetate
A separately cast film of this solution was found to have a refractive index of about 1.431. The over-coated bead bonding solution was dried at about 65° C. for 7 minutes until the surface was tacky and bead coated at about 100° C. with 2.26 refractive index beads having a mean diameter of about 60 micrometers with a plus or minus 10 micrometer distribution. The resulting graphic film was imaged via computer driven knife cutter, followed by weeding, laminated to an intermediate pressure-sensitive adhesive transfer carrier of Example 7 and wet applied to a glass plate to result in an etched glass appearance. The added reinforcing layer aided the weeding operation. Because of the lower refractive index bead bond the prismatic display took place at about 15–31 degrees radial observation angle range Example 14

This example illustrates printing of the beaded layer of a decorative article with a thin transparent ink as another method of creating an image of contrasting color which changes in relation to the base sheet.

The bead bond solution described in Example 5, which as a dried film had a refractive index of 1.533 was knife coated on a release liner to result in a dried thickness of about 38 micrometers. After drying, it was beadcoated using the procedure of Example 5 with 2.26 refractive index glass beads having a mean diameter of about 70 micrometers with a plus or minus 10 micrometer distribution and cured to result in a bead embedment of about 40%–60%. The resulting beadcoat was removed from the release liner and laminated to the pressure-sensitive adhesive described in Example 8, which had been coated on a silicone release liner and dried to result in about a 25 micrometer thickness. Said lamination was to the side of the beadcoat contacting the release liner on which it was coated, i.e., the smooth side. The resulting adhesive coated, bead coated graphic sheet was screen printed on top of the glass beads with an image using the solution described in Example 1, with a 157 mesh polyester screen. This solution produces a film having a refractive index of about 1.518. The thickness of the coating, when measured by screen printing the same solution on a separate flat sheet of known caliper, was found to be about 5 micrometers. The imaged sheet was cut around the perimeter of the printed image to leave a border of unimaged sheet, followed by removal of the release liner and application to a plate of window glass using the wet application technique described in Example 8. The resulting decorative article had the appearance of etched glass. The area of the graphic which had been printed was barely visible in contrast to the unprinted area. However, when illuminated as in Example 1, a prismatic display was observed starting at about 27 degrees radial observation angle where the sheet had been printed and at about 25 degrees observation angle where it had not been printed, thus creating a decorative color contrast between the two areas that changed as a function of increasing viewing angle until the observation angle was beyond the prismatic range for both conditions, wherein the printed image became almost invisible again. Printing with a transparent ink had shifted the prismatic effect 2 degrees to a lower observation angle, creating contrasting colors as a function of viewing angle.

Example 15

This example illustrates how printing of the microsphere surface layer of the decorative article with multiple images can be used to create a 3-D appearance and additional image complexity as observation angle is changed. It also illustrates how the thickness of the ink is important in determining the appearance.

The transfer graphic sheet material of Example 14 was screen printed on the beaded surface with a 157 mesh polyester screen with the solution of Example 1 in sequence, with drying in between, with two complementary images wherein the second image was a background image for the first. The second image was registered slightly offset to overlap the first image such that a pseudo 3-D effect was created. In the printing industry this effect is commonly called a drop shadow. In addition, the registry was such that where the offset took place, the coating thickness was doubled so that about 10 micrometer thickness was present where the images overlapped. After cutting and applying to a transparent glazing the resulting graphic exhibited a bright highlight image between about 0 degrees and about 30 degrees radial observation angle where the two coatings were overlapped and, were therefore, thicker. At observation angles higher than about 30 degrees this thicker portion of the image darkened, providing an image which was the photographic negative of the image seen near the light source. A prismatic display was observed between about 26–42 degrees observation angle in the other areas of the image with the printed area having a 5 micron dried thickness becoming prismatically active at about 2 degrees higher observation angle than the base sheet. The combined effect of the contrast changing as a function of viewing angle increased the illusion of three-dimensionality, much like a hologram with the sudden darkening of the bright highlight image creating an additional dramatic effect. The printing was repeated on the graphic sheet of Example 14, except with the second image being printed with the solution of Example 1 using a 110 mesh screen, such that its dried thickness was about 12 micrometers and the area of the overlapped images was about 17 micrometers. This time a different decorative effect was observed. Instead of a bright highlight, the overlapped areas had become transparent and therefore darker in contrast to the rest of the image at all viewing angles. The image printed with the 110 mesh screen demonstrated a prismatic display starting at about 4 degrees higher observation angle than the base sheet and was therefore in color contrast to both the area printed with the 157 mesh screen and the unprinted areas. This increased the complexity of the prismatic display.

Example 16

This example illustrates how the printing ink can be pigmented and the prismatic display will still result, as long as the thickness of the ink does not achieve the focal point of the lens system and the ink has transparency.

A black pigmented printing ink of the following was formulated to result in about 25% solids:
Resin Solids
11.1% carbon black pigment 53.9% Union Carbide VYNS3, a vinyl chloride/vinyl acetate copolymer resin
26.8% Rohm & Haas Acryloid B44, an acrylic copolymer resin
3.6% C. P. Hall Paraplex G-62, an epoxidized soybean oil plasticizer
2.5% BASF Uvinol N-539, an substituted acrylonitrile ultraviolet light absorber
1.8% Witco Nuostab V-1923, a calcium-zinc salt heat stabilizer
0.1% General Electric SF96, a polymethyl siloxane flow control agent
0.25% Union Carbide A1130, a triaminofunctional silane adhesion promoter
Solvent Blend
34.5% Cyclohexanone
54.0% Diethylene glycol monoethyl ether acetate
11.5% Mixed Aromatic Hydrocarbons, 150° F. flashpoint A decorative image was screen printed using the aforesaid black ink on the beaded side of the transfer graphic described in Example 14 with a 230 mesh polyester screen such that a portion of unprinted sheet was adjacent to portions of the image. A separate control sheet was screen printed in the same manner and found to have an ink thickness of about 5 micrometers. After drying for 10 minutes at about 65° C. the resulting imaged sheet had a prismatic display as described in Example 5. The printed portion of the sheet also had a prismatic display. The blue portion of the display was somewhat masked by the black pigment. However, the green-red portions of the spectrum were observed from about 32–44 degrees observation angle within the black field.

Example 17

A red pigmented printing ink of the following was formulated to result in about 20% solids:
Resin Solids
49.5% perylene pigment
29.7% Union Carbide VYNS3, a vinyl chloride/vinyl acetate copolymer resin
14.8% Rohm & Haas Acryloid B44, an acrylic copolymer resin
2.0% C. P. Hall Paraplex G-62, an epoxidized soybean oil plasticizer
2.5% BASF Uvinol N-539, a substituted acrylonitrile ultraviolet light absorber
1.2% Witco Nuostab V-1923, a calcium-zinc salt heat stabilizer
0.1% General Electric SF96, a polymethyl siloxane flow control agent
0.25% Union Carbide A1130, a triaminofunctional silane adhesion promoter
Solvent Blend
34.5% Cyclohexanone
54.0% Diethylene glycol monoethyl ether acetate
11.5% Mixed Aromatic Hydrocarbons, 150° F. flashpoint A decorative image was screen printed using the aforesaid red ink on the beaded side of the transfer graphic described in Example 14 with a 230 mesh polyester screen such that a portion of unprinted sheet was adjacent to portions of the image. A separate control sheet was screen printed in the same manner and found to have an ink thickness of about 4 micrometers. After drying for 10 minutes at about 65° C. and application to glass, the unprinted portions of the sheet had an observed prismatic display as described in Example 5. The red color of the printed portion of the sheet was altered by the prismatic display from about 26–43 degrees observation angle range such that the color varied from a blue-red to orange-brown in this range.

Example 18

This example illustrates how the illusion of three dimensionality can be created by printing the beads with a graduated tone when making a decorative article of the invention.

The transparent solution of Example 1 was screen printed onto the beaded side of Example 14 transfer graphic sheeting using a 175 mesh screen having an image of a circle with a 60 line/inch radial halftone blend varying from 20% open area starting one-tenth diameter off center of the circle to 100% open area at the edges. This resulted in a gradual reduction in the thickness of clear ink from the edge of the circle to a point slightly off center. After drying and application to glass, the resulting prismatic display created the illusion that the circle was a three-dimensional sphere with the edge of the sphere slightly darker in appearance at observation angles less than the prismatic display. The edge of the sphere also became prismatically active at about 27 degrees observation angle which was 2 degrees after the unprinted background. The edge of the circle was also the last to darken as the observation angle increased beyond the prismatic display, and the slightly off center point was the first to darken. This created the illusion that the center of the circle was closer to the observer. The experiment was repeated, except this time the halftone image was screen printed twice with drying in between and after, making sure that the second print was in registry over the first. Then this image was applied to glass and observed relative to a light source. At observation angles from about 0–30 degrees the edge portion of the sphere with the thickest coating was very bright, indicating that the thicker coating was causing a lens focal point. At about 23 degrees observation angle, the prismatic display started at the slightly off center point where no ink had been printed and progressed toward the edge, as the observation angle increased. Meanwhile, the edge of the circle remained bright. At about 31 degrees the edge portion of the circle darkened, which created a dramatic effect as the observation angle passed through this point going from a photopositive to photonegative image. The uncoated portion of the circle, was the last portion of the image to darken. The combined effect enhanced the 3-D appearance of the image.

While this invention has been described in connection with specific embodiments, it should be understood that it is capable of further modification. The claims herein are intended to cover those variations which one skilled in the art would recognize as the equivalent of what has been described herein.

What is claimed:

1. A decorative article comprising:
    (a) a transparent substrate;
    (b) a layer of transparent solid glass microspheres bonded to one side of the transparent substrate in the form of an image, by a transparent microsphere bonding layer, wherein the microspheres are partially embedded in the transparent microsphere bonding layer, wherein, about 20% to about 80% of the average diameter of each microsphere is embedded in the transparent microsphere bonding layer, and wherein the ratio of the transparent microsphere refractive index to the transparent microsphere bonding layer refractive index is about 1.3:1 to about 1.7:1;
    (c) an optional transparent adhesive layer affixed between the transparent substrate and the transparent microsphere bonding layer; and (d) an optional transparent reinforcing layer affixed between the microsphere bonding layer and the optional transparent adhesive layer, when present;

wherein the image has an etched appearance and wherein the image exhibits a rainbow-like color change at different viewing angles relative to an illuminating source when viewed through a side of the transparent substrate opposite the glass microspheres.

2. The decorative article of claim 1 wherein the microspheres have an average diameter of about 5 to about 200 microns.

3. The decorative article of claim 1 wherein the microspheres have an average diameter of about 40 to about 150 microns.

4. The decorative article of claim 1 wherein the microspheres have an average diameter of about 60 to about 90 microns.

5. The decorative article of claim 1 which further comprises at least one coating on some of the microspheres, wherein said coating(s) is on surfaces of the microspheres not embedded in the transparent bonding layer.

6. The decorative article of claim 5 which exhibits a three-dimensional appearing prismatic display.

7. The decorative article of claim 5 wherein, about 40 to about 60% of the average diameter of each microsphere is embedded in the transparent bonding layer.

8. The decorative article of claim 5 which exhibits an image change from a photopositive to a photonegative, or from a photonegative to a photopositive, as a viewer changes position relative to a single illumination source.

9. The decorative article of claim 5 wherein the coating(s) is selected from the group consisting of opaque, translucent, and transparent colored coatings.

10. The decorative article of claim 5 wherein the coating (s) is colorless and transparent.

11. The decorative article of claim 5 wherein the coating (s) is selected from the group consisting of inks, paints, lacquers, and varnishes.

12. The decorative article of claim 5 wherein two coatings are present, wherein one coating is a positive image and one coating is a negative image, which images are offset printed from each other.

13. The decorative article of claim 5 wherein two coatings are present wherein one coating is colorless and transparent and the other coating is colored and transparent.

14. The decorative article of claim 5 wherein one coating is present which coating is of differing thickness.

15. The decorative article of claim 1 which exhibits either visibly overlapping or discrete multiple prismatic displays from a single illumination source.

16. The decorative article of claim 1 which exhibits a three-dimensional appearing prismatic display.

17. The decorative article of claim 1 wherein said transparent substrate is selected from the group consisting of glass and plastic.

18. The decorative article of claim 1 wherein fractional microsphere populations of more than one refractive index are present.

19. The decorative article of claim 1 wherein the transparent microsphere bonding layer has the same refractive index throughout and wherein two or more sections of the image have microspheres of differing refractive index embedded in the transparent microsphere bonding layer.

20. The decorative article of claim 1 wherein the microspheres are of the same refractive index and wherein the transparent microsphere bonding layer has two or more sections of differing refractive index.

21. The decorative article of claim 1 wherein about 30 to about 70% of the average diameter of each microsphere is embedded in the transparent bonding layer.

22. The decorative article of claim 1 wherein the ratio of the transparent microsphere refractive index to the transparent microsphere bonding layer refractive index is about 1.35 to about 1.55.

23. A transfer graphic comprising:
(a) a release liner,
(b) a discontinuous transparent microsphere bonding layer formed on one side of the release liner;
(c) a layer of transparent solid glass microspheres partially embedded in the discontinuous transparent microsphere bonding layer, wherein about 20% to about 80% of the average diameter of each microsphere diameter is embedded in the transparent microsphere bonding layer, wherein the ratio of the transparent microsphere refractive index to the transparent microsphere bonding layer refractive index is about 1.3:1 to about 1.7:1;
(d) an optional transparent adhesive layer affixed between the release liner and the transparent microsphere bonding layer; and
(e) an optional transparent reinforcing layer affixed between the transparent microsphere bonding layer and the optional transparent adhesive layer; and
(f) a transfer carrier positioned against the glass microspheres.

24. The transfer graphic of claim 23 wherein the microspheres have an average diameter of about 5 to about 200 microns.

25. The transfer graphic of claim 23 wherein the microspheres have an average diameter of about 40 to about 150 microns.

26. The transfer graphic of claim 23 wherein the microspheres have an average diameter of about 30 to about 90 microns.

27. The transfer graphic of claim 26 which further comprises at least one coating on some of the microspheres, wherein said coating(s) is on surfaces of the microspheres not embedded in the transparent bonding layer.

28. The transfer graphic of claim 27 which is capable of forming a decorative article which exhibits either visibly overlapping or discrete multiple prismatic displays from a single illumination source.

29. The transfer graphic of claim 27 which is capable of forming a decorative article which exhibits a three-dimensional appearing prismatic display.

30. The transfer graphic of claim 27 which exhibits an image change from a photopositive to a photonegative, or from a photonegative to a photopositive, as a viewer changes position relative to a single illumination source.

31. The transfer graphic of claim 27 wherein the coating (s) is selected from the group consisting of opaque, translucent, and transparent colored coatings.

32. The transfer graphic of claim 27 wherein the coating (s) is colorless and transparent.

33. The transfer graphic of claim 27 wherein the coating (s) is selected from the group consisting of inks, paints, lacquers, and varnishes.

34. The transfer graphic of claim 27 wherein two coatings are present, wherein one coating is a positive image and one coating is a negative image, which images are offset printed from each other.

35. The transfer graphic of claim 27 wherein two coatings are present wherein one coating is colorless and transparent and the other coating is colored and transparent.

36. The transfer graphic of claim 27 wherein one coating is present which coating is of differing thickness.

37. The transfer graphic of claim 23 which is capable of forming a decorative article which exhibits a three-dimensional appearing prismatic display.

38. The transfer graphic of claim 23 wherein fractional microsphere populations of more than one refractive index are present.

39. The transfer graphic of claim 23 wherein the imaged transparent microsphere bonding layer has the same refractive index and wherein two or more sections of the image have microspheres of differing refractive index embedded in the transparent microsphere bonding layer.

40. The transfer graphic of claim 23 wherein the microspheres are of the same refractive index while the transparent microsphere bonding layer has two or more sections of differing refractive index.

41. The transfer graphic of claim 23 wherein about 30 to about 70% of the average diameter of each microsphere is embedded in the transparent bonding layer.

42. The transfer graphic of claim 23 wherein about 40 to about 60% of the average diameter of each microsphere is embedded in the transparent bonding layer.

43. The transfer graphic of claim 23 wherein the ratio of the transparent microsphere refractive index to the transparent microsphere bonding layer refractive index is about 1.35 to about 1.55.

44. An imaged graphic media comprising:
   (a) a release liner;
   (b) a discontinuous transparent microsphere bonding layer formed on one side of the release liner;
   (c) a layer of transparent solid glass microspheres partially embedded in the transparent microsphere bonding layer, wherein about 20% to about 80% of the average diameter of each microsphere diameter is embedded in the transparent bonding layer, wherein the ratio of the transparent microsphere refractive index to the transparent microsphere bonding layer refractive index is about 1.3:1 to about 1.7:1;
   (d) an optional transparent adhesive layer affixed between said transparent microsphere bonding layer and said transparent adhesive layer; and
   (e) an optional transparent reinforcing layer affixed between said transparent microsphere bonding layer and said transparent adhesive layer, when present.

45. The imaged graphic media of claim 44 wherein the microspheres have an average diameter of about 5 to about 200 microns.

46. The imaged graphic media of claim 44 wherein the microspheres have an average diameter of about 40 to about 150 microns.

47. The imaged graphic media of claim 44 wherein the microspheres have an average diameter of about 30 to about 90 microns.

48. The imaged graphic media of claim 44 which further comprises at least one coating on some of the microspheres, wherein said coating(s) is on the surface of the microspheres not embedded in the transparent bonding layer.

49. The imaged graphic media of claim 48 which is capable of forming a decorative article which exhibits a three-dimensional appearing prismatic display.

50. The imaged graphic media of claim 48 wherein the coating(s) is selected from the group consisting of opaque, translucent, and transparent colored coatings.

51. The imaged graphic media of claim 48 wherein the coating(s) is colorless and transparent.

52. The imaged graphic media of claim 48 wherein the coating(s) is selected from the group consisting of inks, paints, lacquers, and varnishes.

53. The imaged graphic media of claim 48 wherein two coatings are present, wherein one coating is a positive image and one coating is a negative image, which images are offset printed from each other.

54. The imaged graphic media of claim 48 wherein two coatings are present wherein one coating is colorless and transparent and the other coating is colored and transparent.

55. The imaged graphic media of claim 48 wherein one coating is present which coating is of differing thickness.

56. The imaged graphic media of claim 44 which is capable of forming a decorative article which exhibits either visibly overlapping or discrete multiple prismatic displays from a single illumination source.

57. The imaged graphic media of claim 44 which is capable of forming a decorative article which exhibits a three-dimensional appearing prismatic display.

58. The imaged graphic media of claim 57 which is capable of forming a decorative article which exhibits an image change from a photopositive to a photonegative, or from a photonegative to a photopositive, as a viewer changes position relative to a single illumination source.

59. The imaged graphic media of claim 44 wherein fractional microsphere populations of more than one refractive index are present.

60. The imaged graphic media of claim 44 wherein the transparent microsphere bonding layer has the same refractive index throughout and wherein two or more sections of the image have microspheres of differing refractive index embedded in the transparent microsphere bonding layer.

61. The imaged graphic media of claim 44 wherein the microspheres are of the same refractive index and wherein the transparent microsphere bonding layer has two or more sections of differing refractive index.

62. The imaged graphic media of claim 44 wherein about 30 to about 70% of the average diameter of each microsphere is embedded in the transparent bonding layer.

63. The imaged graphic media of claim 44 wherein, about 40 to about 60% of the average diameter of each microsphere is embedded in the transparent bonding layer.

64. The imaged graphic media of claim 44 wherein the ratio of the transparent microsphere refractive index to the transparent microsphere bonding layer refractive index is about 1.35 to about 1.55.

65. A decorative article comprising:
   (a) a transparent substrate;
   (b) a continuous layer of transparent solid glass microspheres bonded to one side of the transparent substrate by a transparent microsphere bonding layer, wherein the microspheres are partially embedded in the transparent microsphere bonding layer, wherein, about 20% to about 80% of the average diameter of each microsphere is embedded in the transparent microsphere bonding layer, and wherein the ratio of the transparent microsphere refractive index to the transparent microsphere bonding layer refractive index is about 1.3:1 to about 1.7:1;
   (c) at least one coating on some of the microspheres wherein said coating(s) is on surfaces of the microsphere not embedded in the transparent microsphere bonding layer;
   (d) an optional transparent adhesive layer affixed between the transparent substrate and the transparent microsphere bonding layer; and
   (e) an optional transparent reinforcing layer affixed between the microsphere bonding layer and the optional transparent adhesive layer, when present;

wherein the image has an etched appearance and wherein the image exhibits a rainbow-like color change at different viewing angles relative to an illuminating source when viewed through a side of the transparent substrate opposite the glass microspheres.

66. The decorative article of claim 65 wherein the microspheres have an average diameter of about 5 to about 200 microns.

67. The decorative article of claim 65 wherein the microspheres have an average diameter of about 40 to about 150 microns.

68. The decorative article of claim 65 wherein the microspheres have an average diameter of about 60 to about 90 microns.

69. The decorative article of claim 65 which exhibits either visibly overlapping or discrete multiple prismatic displays from a single illumination source.

70. The decorative article of claim 65 which exhibits a three-dimensional appearing prismatic display.

71. The decorative article of claim 65 wherein said transparent substrate is selected from the group consisting of glass and plastic.

72. The decorative article of claim 65 wherein fractional microsphere populations of more than one refractive index are present.

73. The decorative article of claim 65 wherein the transparent microsphere bonding layer has the same refractive index throughout and wherein two or more sections of the image have microspheres of differing refractive index embedded in the transparent microsphere bonding layer.

74. The decorative article of claim 65 wherein the microspheres are of the same refractive index and wherein the transparent microsphere bonding layer has two or more sections of differing refractive index.

75. The decorative article of claim 65 wherein about 30 to about 70% of the average diameter of each microsphere is embedded in the transparent bonding layer.

76. The decorative article of claim 65 wherein about 40 to about 60% of the average diameter of each microsphere is embedded in the transparent bonding layer.

77. The decorative article of claim 65 which exhibits an image change from a photopositive to a photonegative, or from a photonegative to a photopositive, as a viewer changes position relative to a single illumination source.

78. The decorative article of claim 65 wherein the coating (s) is selected from the group consisting of opaque, translucent, and transparent colored coatings.

79. The decorative article of claim 65 wherein the coating (s) is colorless and transparent.

80. The decorative article of claim 65 wherein the coating (s) is selected from the group consisting of inks, paints, lacquers, and varnishes.

81. The decorative article of claim 65 wherein the ratio of the transparent microsphere refractive index to the transparent microsphere bonding layer refractive index is about 1.35 to about 1.55.

82. The decorative article of claim 65 wherein two coatings are present, wherein one coating is a positive image and one coating is a negative image, which images are offset printed from each other.

83. The decorative article of claim 65 wherein two coatings are present wherein one coating is colorless and transparent and the other coating is colored and transparent.

84. The decorative article of claim 65 wherein one coating is present which coating is of differing thickness.

* * * * *